US010149160B2

(12) United States Patent
Zhang et al.

(10) Patent No.: US 10,149,160 B2
(45) Date of Patent: Dec. 4, 2018

(54) RECOGNIZING AND AUTHENTICATING MOBILE DEVICES BASED ON UNIQUE CROSS-CHANNEL BINDINGS

(71) Applicant: Bank of America Corporation, Charlotte, NC (US)

(72) Inventors: Xianhong Zhang, Issaquah, WA (US); Apeksh M. Dave, Weddington, NC (US); Elizabeth S. Votaw, Potomac, MD (US); Andrew T. Keys, Albany, OR (US); Mark A. Pender, Rockville Center, NY (US)

(73) Assignee: Bank of America Corporation, Charlotte, NC (US)

( * ) Notice: Subject to any disclaimer, the term of this patent is extended or adjusted under 35 U.S.C. 154(b) by 240 days.

(21) Appl. No.: 15/151,802

(22) Filed: May 11, 2016

(65) Prior Publication Data

US 2017/0332233 A1 Nov. 16, 2017

(51) Int. Cl.
*H04W 12/06* (2009.01)
*H04W 12/08* (2009.01)
(Continued)

(52) U.S. Cl.
CPC ............ *H04W 12/06* (2013.01); *G06F 21/44* (2013.01); *G06F 21/62* (2013.01); *H04M 15/47* (2013.01); *H04M 15/8235* (2013.01); *H04W 4/24* (2013.01); *H04W 12/08* (2013.01); *G06F 21/60* (2013.01); *H04L 67/306* (2013.01)

(58) Field of Classification Search
CPC ....... H04W 12/06; H04W 12/08; H04W 4/24; H04M 15/47; H04M 15/8235; H04L 67/306; G06F 21/44; G06F 21/62; G06F 21/60
See application file for complete search history.

(56) References Cited

U.S. PATENT DOCUMENTS

| 2007/0143629 A1* | 6/2007 | Hardjono | H04L 63/0823 713/189 |
| 2014/0057596 A1* | 2/2014 | Brill | H04L 63/126 455/410 |

(Continued)

*Primary Examiner* — Izunna Okeke
*Assistant Examiner* — Cheng-Feng Huang
(74) *Attorney, Agent, or Firm* — Banner & Witcoff, Ltd.; Michael A. Springs

(57) ABSTRACT

Aspects of the disclosure relate to recognizing and authenticating mobile devices based on unique cross-channel bindings. In some embodiments, a computing platform may receive, from a telephone agent support computer system, call information associated with a telephone call. Subsequently, the computing platform may identify a source device that placed the telephone call, based on binding information maintained by the computing platform for the source device. Based on identifying the source device that placed the telephone call, the computing platform may load user information associated with a user account linked to the source device. Next, the computing platform may set one or more authentication flags for the user account based on the binding information. Then, the computing platform may send, to the telephone agent support computer system, the user information and authentication information based on the one or more authentication flags set for the user account linked to the source device.

20 Claims, 20 Drawing Sheets

(51) Int. Cl.
  H04M 15/00  (2006.01)
  G06F 21/62  (2013.01)
  G06F 21/44  (2013.01)
  H04W 4/24   (2018.01)
  H04L 29/08  (2006.01)
  G06F 21/60  (2013.01)

(56) References Cited

U.S. PATENT DOCUMENTS

| | | | |
|---|---|---|---|
| 2015/0094026 A1* | 4/2015 | Martin | G06Q 30/016 455/411 |
| 2015/0244696 A1* | 8/2015 | Ma | H04L 63/08 726/4 |
| 2016/0112896 A1 | 4/2016 | Karampatsis et al. | |
| 2016/0112952 A1 | 4/2016 | Ise | |
| 2016/0113057 A1 | 4/2016 | Haneji et al. | |
| 2016/0114745 A1 | 4/2016 | Ricci | |
| 2016/0117229 A1 | 4/2016 | Epstein | |
| 2016/0117476 A1 | 4/2016 | Hanina et al. | |
| 2016/0117482 A1 | 4/2016 | Hanina et al. | |
| 2016/0117497 A1 | 4/2016 | Saxena et al. | |
| 2016/0117498 A1 | 4/2016 | Saxena et al. | |
| 2016/0117611 A1 | 4/2016 | Greenberg et al. | |
| 2016/0117786 A1 | 4/2016 | Packes et al. | |
| 2016/0117788 A1 | 4/2016 | Ptalis et al. | |
| 2016/0117789 A1 | 4/2016 | Ptalis et al. | |
| 2016/0118793 A1 | 4/2016 | Davis et al. | |
| 2016/0119260 A1 | 4/2016 | Ghafourifar et al. | |
| 2016/0119261 A1 | 4/2016 | Ghafourifar et al. | |
| 2016/0119274 A1 | 4/2016 | Ghafourifar et al. | |
| 2016/0119283 A1 | 4/2016 | Ptalis et al. | |
| 2016/0119321 A1 | 4/2016 | Krishnaprasad et al. | |
| 2016/0119330 A1 | 4/2016 | L'Heureux et al. | |
| 2016/0119354 A1 | 4/2016 | Logue et al. | |
| 2016/0119402 A1 | 4/2016 | Kumar | |
| 2016/0119424 A1 | 4/2016 | Kane et al. | |
| 2016/0119504 A1 | 4/2016 | Baba | |
| 2016/0119633 A1 | 4/2016 | Neuman | |
| 2016/0119972 A1 | 4/2016 | Suzuki et al. | |
| 2016/0123749 A1 | 5/2016 | Sekiguchi et al. | |
| 2016/0124071 A1 | 5/2016 | Baxley et al. | |
| 2016/0124674 A1 | 5/2016 | Seo et al. | |
| 2016/0124868 A1 | 5/2016 | Logue | |
| 2016/0124885 A1 | 5/2016 | Vajravel | |
| 2016/0125184 A1 | 5/2016 | Mahaffey et al. | |
| 2016/0125386 A1 | 5/2016 | Desai et al. | |
| 2016/0125394 A1 | 5/2016 | Desai et al. | |
| 2016/0125405 A1 | 5/2016 | Alterman et al. | |
| 2016/0125414 A1 | 5/2016 | Desai et al. | |
| 2016/0125417 A1 | 5/2016 | Huang et al. | |
| 2016/0125733 A1 | 5/2016 | Sallas et al. | |
| 2016/0127087 A1 | 5/2016 | Feher | |
| 2016/0127165 A1 | 5/2016 | Feher | |
| 2016/0127251 A1 | 5/2016 | Ovsiannikov | |
| 2016/0127265 A1 | 5/2016 | Cavage et al. | |
| 2016/0127348 A1 | 5/2016 | Bradley et al. | |
| 2016/0127349 A1 | 5/2016 | Nakajima et al. | |
| 2016/0127577 A1 | 5/2016 | Okamoto et al. | |
| 2016/0127803 A1 | 5/2016 | Shanson et al. | |
| 2016/0127815 A1 | 5/2016 | Ookuri et al. | |
| 2016/0127875 A1 | 5/2016 | Zampini, II | |
| 2016/0127931 A1 | 5/2016 | Baxley et al. | |
| 2016/0128104 A1 | 5/2016 | Logue | |
| 2016/0241402 A1* | 8/2016 | Gordon | H04L 9/3228 |

* cited by examiner

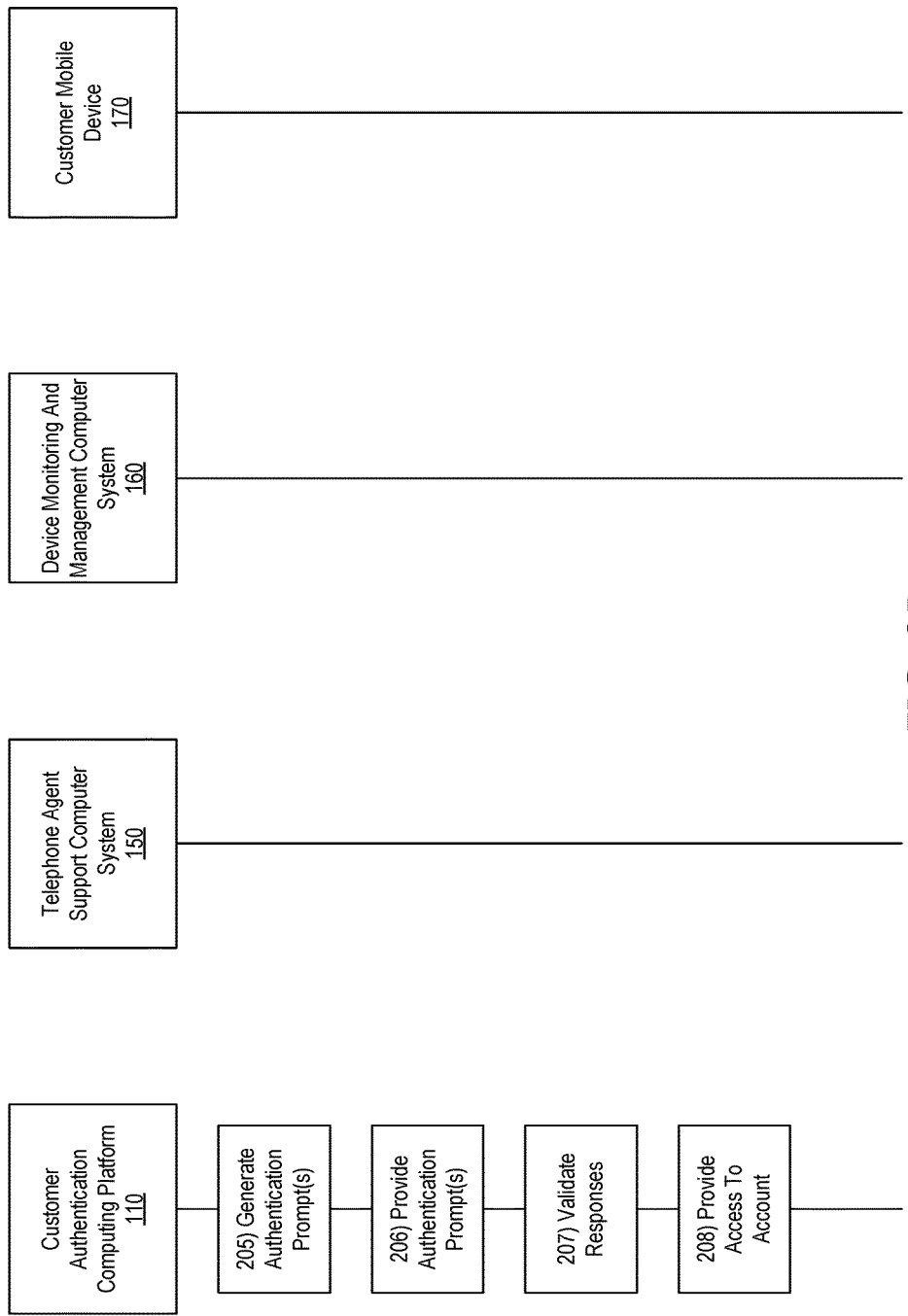

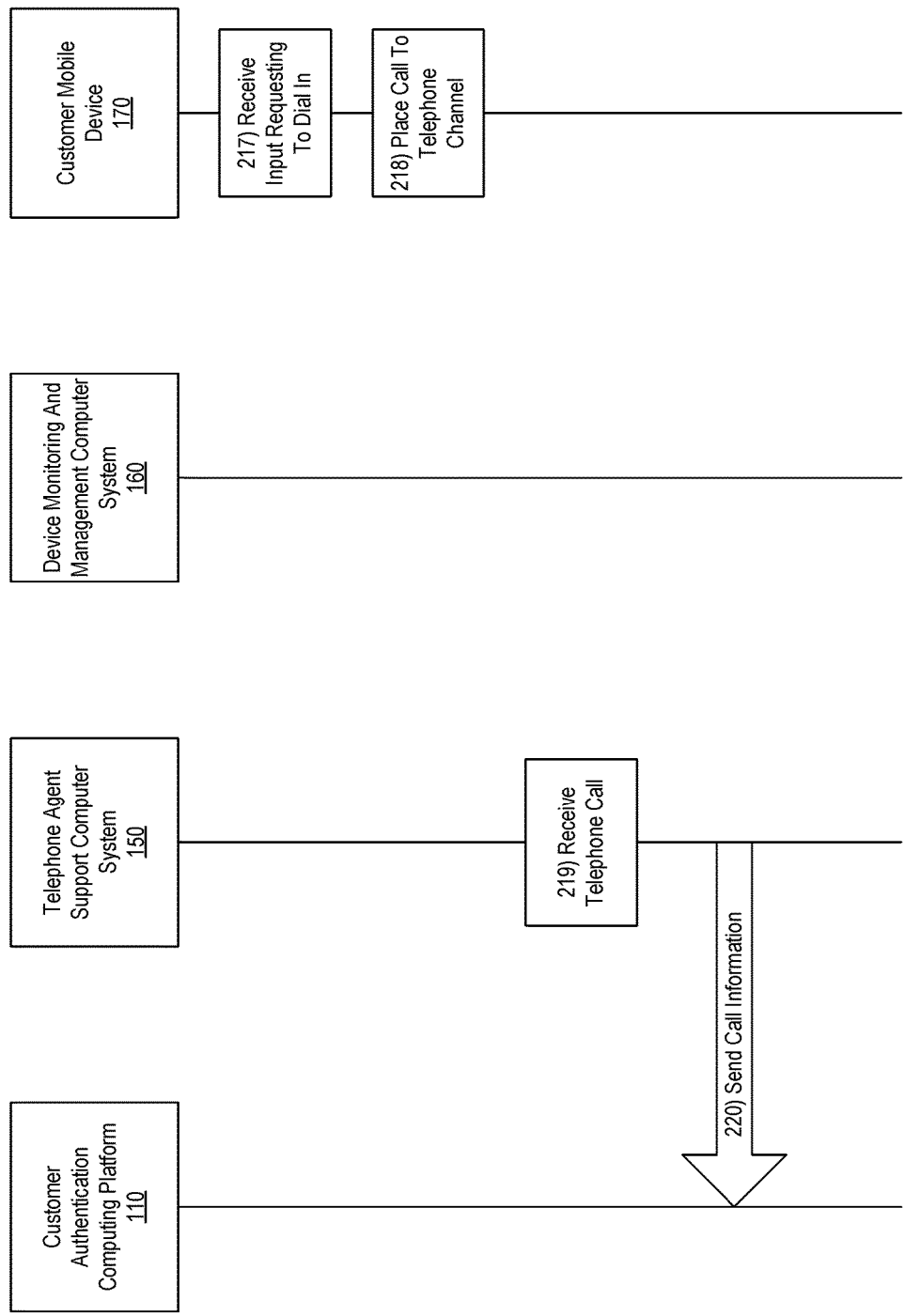

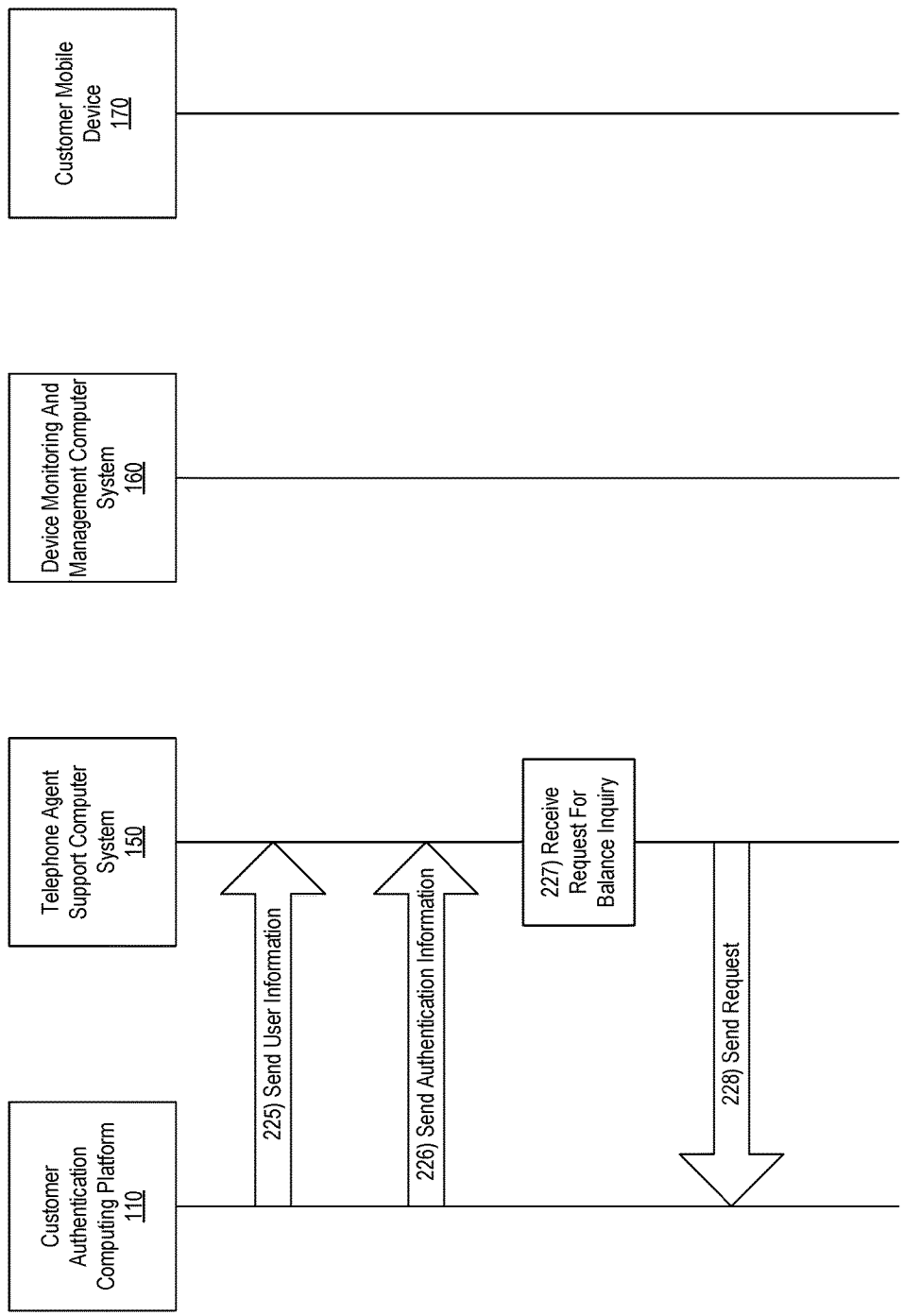

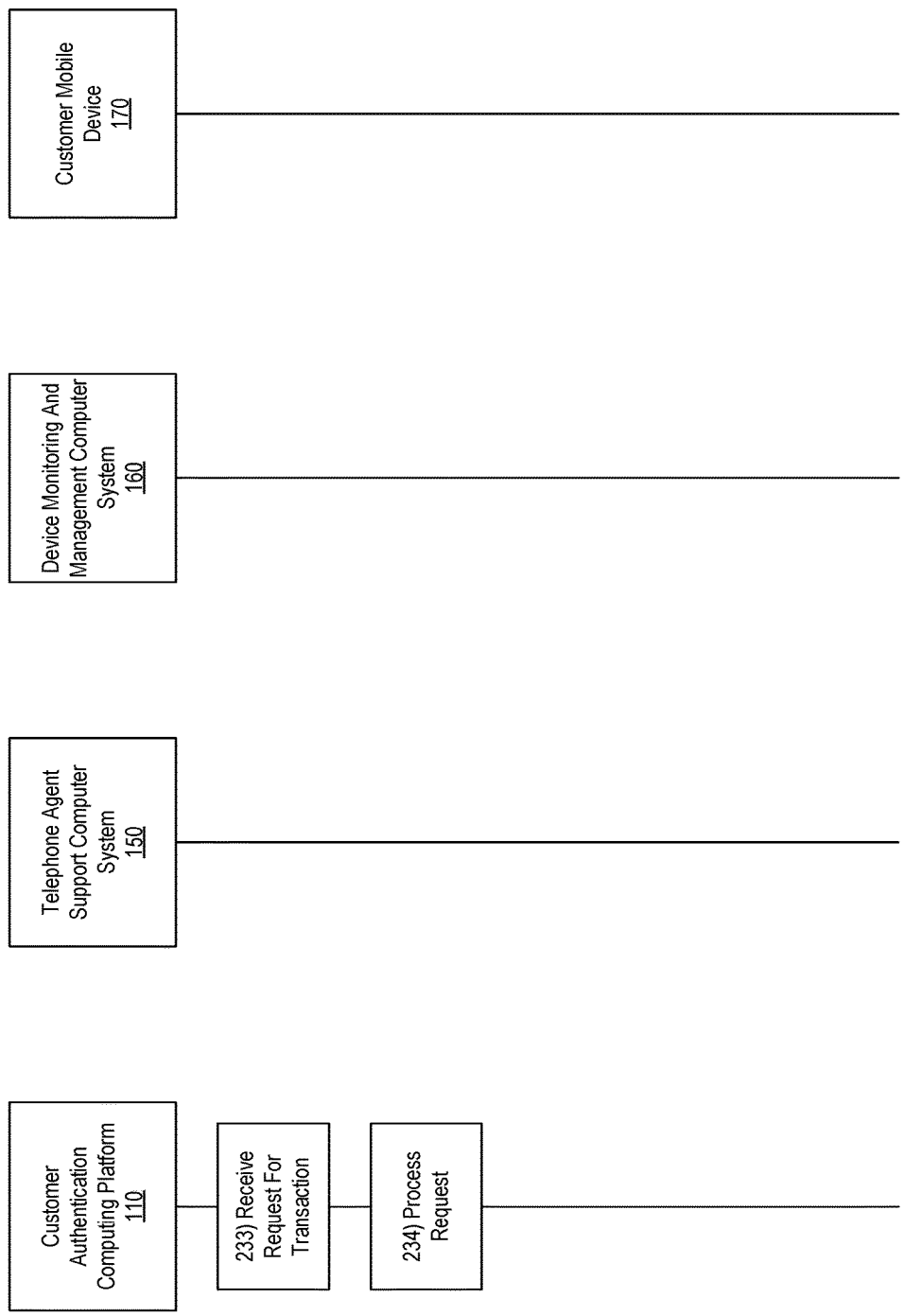

RECOGNIZING AND AUTHENTICATING MOBILE DEVICES BASED ON UNIQUE CROSS-CHANNEL BINDINGS

BACKGROUND

Aspects of the disclosure relate to computer hardware and software. In particular, one or more aspects of the disclosure generally relate to computer hardware and software for recognizing and authenticating mobile devices based on unique cross-channel bindings.

Mobile computing devices are becoming increasingly popular, and many organizations are developing and providing their clients, employees, and others with mobile applications or "apps." These mobile applications may, for instance, allow clients, employees, and others to interact with the organization in various ways, depending on the functionality built into the particular application.

As organizations engage with clients using applications and other new technology, it may be increasingly important for such organizations to maintain and ensure the safety and security of client information. In some instances, however, the mobile devices on which such applications run can create information security issues and other issues for an organization and its computer systems, and it may be difficult to provide technical solutions that address and overcome the technical problems that create and underlie these information security issues and other issues.

SUMMARY

Aspects of the disclosure provide effective, efficient, scalable, and convenient technical solutions that address and overcome the technical problems associated with maintaining and ensuring the safety and security of client information.

For example, one or more aspects of the disclosure provide ways of recognizing and authenticating mobile devices based on unique cross-channel bindings. For instance, a client or other end user of an organization may use a customized mobile application or "app" on their personal mobile device to access their user account information and/or other information that may be maintained by the organization. The mobile application may be developed and/or provided by the organization for use by its clients and/or other end users, and in using such an application, a user may be authenticated to a user account by providing one or more authentication credentials, such as a username, password, one-time passcode, biometric input, and/or the like.

During the authentication process, the organization and its computer systems may gather and/or collect information about the user and/or the device. As discussed in greater detail below, this information (which may, e.g., form and/or operate as a device "fingerprint") may enable the organization and its computer systems to recognize the user and/or the device in the future, even in instances in which the user uses the device to contact the organization via another channel different from a mobile application channel. For instance, the user may use the device to call into a telephone agent channel of the organization to obtain access to and/or assistance with their user account over the phone from a telephone agent of the organization. By implementing one or more aspects of the disclosure, the organization and its computer systems may recognize and/or authenticate the user and/or the device in such instances using binding information that may be maintained by the organization and its computer systems across different channels.

As illustrated in greater detail below, one or more aspects of the disclosure thus may enable the organization to better ensure the safety and security of client information, while also allowing clients and/or other end users of the organization to more conveniently and securely access their user account information and/or other information that may be maintained by the organization across different channels of the organization.

In accordance with one or more embodiments, a customer authentication computing platform having at least one processor, a memory, and a communication interface may receive, via the communication interface, and from a telephone agent support computer system associated with a telephone agent channel, call information associated with a telephone call received by the telephone agent support computer system associated with the telephone agent channel. Subsequently, the computing platform may identify a source device that placed the telephone call received by the telephone agent support computer system associated with the telephone agent channel, based on binding information maintained by the computing platform for the source device. Based on identifying the source device that placed the telephone call received by the telephone agent support computer system associated with the telephone agent channel, the computing platform may load user information associated with a user account linked to the source device. Next, the computing platform may set one or more authentication flags for the user account linked to the source device based on the binding information maintained by the computing platform for the source device. Then, the computing platform may send, via the communication interface, and to the telephone agent support computer system associated with the telephone agent channel, the user information associated with the user account linked to the source device. In addition, the computing platform may send, via the communication interface, and to the telephone agent support computer system associated with the telephone agent channel, authentication information based on the one or more authentication flags set for the user account linked to the source device.

In some embodiments, prior to receiving the call information associated with the telephone call from the telephone agent support computer system, the computing platform may receive, via the communication interface, and from the source device, an authentication request. Based on receiving the authentication request from the source device, the computing platform may generate one or more authentication prompts for the source device. Subsequently, the computing platform may provide the one or more authentication prompts to the source device. Then, the computing platform may validate one or more responses to the one or more authentication prompts provided to the source device. Based on validating the one or more responses to the one or more authentication prompts provided to the source device, the computing platform may provide the source device with access to user account information.

In some embodiments, prior to receiving the call information associated with the telephone call from the telephone agent support computer system, and after providing the source device with access to user account information, the computing platform may generate a probe request for the source device. Subsequently, the computing platform may send, via the communication interface, and to a device monitoring and management computer system, the probe request generated for the source device. Thereafter, the computing platform may receive, via the communication interface, and from the device monitoring and management computer system, device information for the source device. Then, the computing platform may bind the device information for the source device to the user account to link the source device to the user account.

In some instances, binding the device information for the source device to the user account to link the source device to the user account may include creating the binding information maintained by the computing platform for the source device based on the device information for the source device received from the device monitoring and management computer system.

In some embodiments, the binding information maintained by the computing platform for the source device may include a unique device identifier for the source device. In some instances, the binding information maintained by the computing platform for the source device may include account profile information linking the unique device identifier for the source device to the user account. In some instances, the unique device identifier for the source device is derived by a device monitoring and management computer system based on one or more attributes of the source device. In some instances, the binding information maintained by the computing platform for the source device may include a telephone number assigned to the source device.

In some embodiments, identifying the source device that placed the telephone call received by the telephone agent support computer system associated with the telephone agent channel may include matching a first telephone number associated with the telephone call received by the telephone agent support computer system to a second telephone number associated with a unique device identifier of the source device included in the binding information maintained by the computing platform for the source device.

In some embodiments, sending the user information associated with the user account linked to the source device to the telephone agent support computer system may include sending, to the telephone agent support computer system, customer name information associated with the user account linked to the source device, customer account information associated with the user account linked to the source device, and transaction history information associated with the user account linked to the source device.

In some embodiments, setting the one or more authentication flags for the user account linked to the source device based on the binding information maintained by the computing platform for the source device may include setting a first authentication flag allowing a first level of access to the user account based on a device authentication score associated with the source device being below a first threshold, setting a second authentication flag allowing a second level of access to the user account based on the device authentication score associated with the source device being at or above the first threshold and below a second threshold, and setting a third authentication flag allowing a third level of access to the user account based on the device authentication score associated with the source device being at or above the second threshold.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2I depict an illustrative event sequence for recognizing and authenticating mobile devices based on unique cross-channel bindings in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
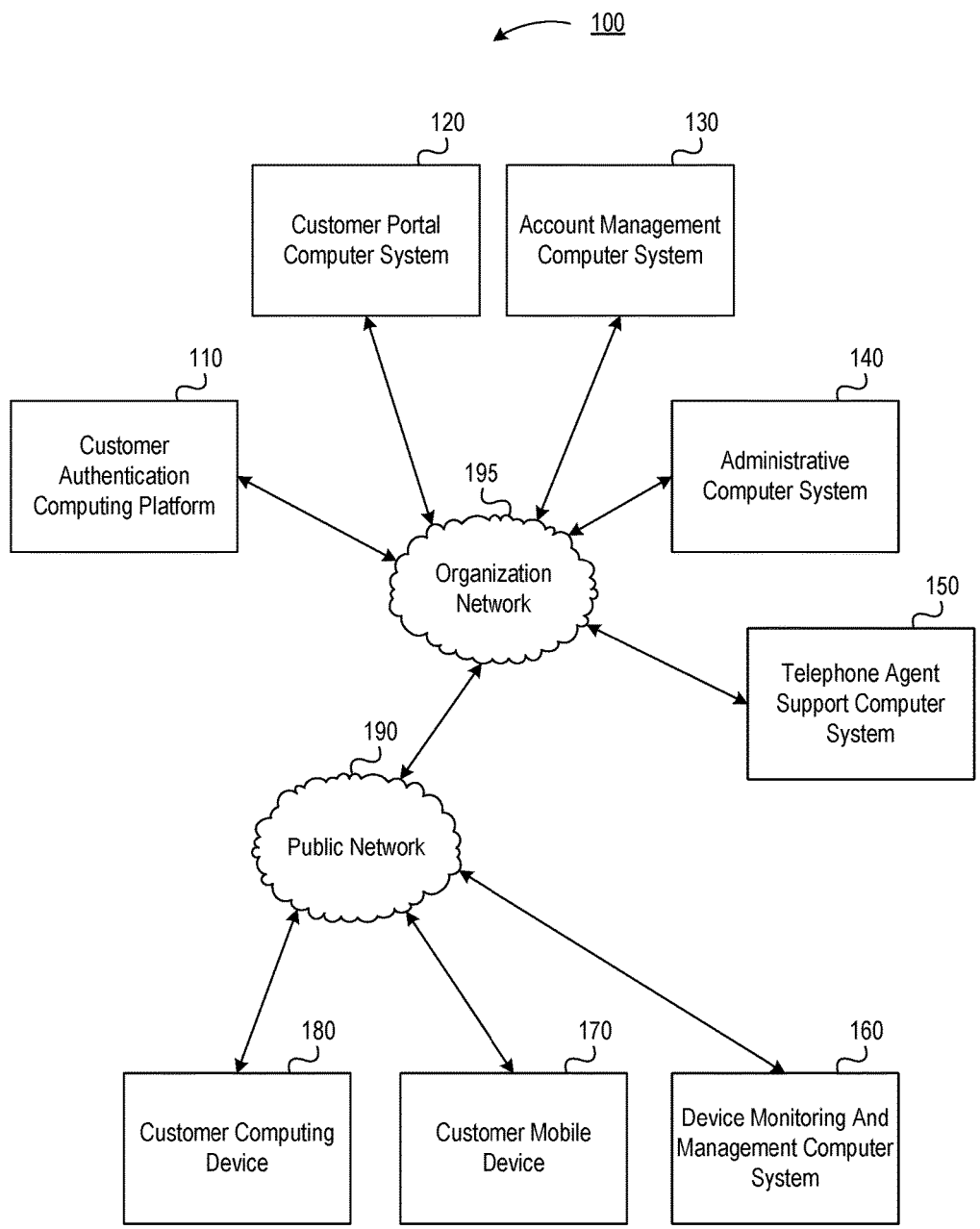
FIGS. 1A-1I depict an illustrative computing environment for recognizing and authenticating mobile devices based on unique cross-channel bindings in accordance with one or more example embodiments.

FIGS. 1A-1I depict an illustrative computing environment for recognizing and authenticating mobile devices based on unique cross-channel bindings in accordance with one or more example embodiments. Referring to FIG. 1A, computing environment 100 may include one or more computing devices. For example, computing environment 100 may include a customer portal computer system 120, an account management computer system 130, an administrative computer system 140, a telephone agent support computer system 150, a device monitoring and management computer system 160, a customer mobile device 170, and a customer computing device 180.

Customer portal computer system 120 may be configured to provide a customer portal or other customer website to one or more computing devices used by one or more customers of an organization. For instance, customer portal computer system 120 may be configured to provide an online banking portal or other online banking website to one or more computing devices used by one or more customers of a financial institution. Account management computer system 130 may be configured to store and/or maintain account information for one or more customers of an organization. For instance, account management computer system 130 may be configured to store and/or maintain account information for one or more customers of a financial institution. Administrative computer system 140 may be configured to provide one or more interfaces that allow for configuration and management of one or more other computing devices and/or computer systems included in computing environment 100.

Telephone agent support computer system 150 may be configured to support operations of and/or be used by one or more telephone agents and/or customer service representatives of an organization. For instance, telephone agent support computer system 150 may be configured to store, access, and/or present various types of information, including customer information, to one or more telephone agents and/or customer service representatives of a financial institution (e.g., while they are assisting one or more customers of the financial institution over the phone). Additionally or alternatively, telephone agent support computer system 150 may include and/or interface with one or more interactive voice response (IVR) systems of an organization, such as a financial institution, which may enable telephone agent support computer system 150 to place and/or receive one or more telephone calls to and/or from one or more customers of an organization, as discussed below.

Device monitoring and management computer system 160 may be configured to monitor and/or manage one or more computing devices in computing environment 100. For example, device monitoring and management computer system 160 may be configured to monitor and/or manage customer mobile device 170 and/or customer computing device 180 (e.g., to obtain device state information, device attributes information, and/or other information from customer mobile device 170 and/or customer computing device 180), as illustrated in greater detail below.

Customer mobile device 170 may be a mobile computing device (e.g., a smart phone, a tablet computer, a smart watch, a wearable device, or other mobile device) that is configured to be used by a customer of an organization, such as a customer of a financial institution. Customer computing device 180 may be a traditional computing device (e.g., a desktop computer, a laptop computer, or the like) that is configured to be used by a customer of an organization, such as a customer of a financial institution.

In one or more arrangements, customer portal computer system 120, account management computer system 130, administrative computer system 140, telephone agent support computer system 150, device monitoring and management computer system 160, customer mobile device 170, and customer computing device 180 may be any type of computing device capable of receiving a user interface, receiving input via the user interface, and communicating the received input to one or more other computing devices. For example, customer portal computer system 120, account management computer system 130, administrative computer system 140, telephone agent support computer system 150, device monitoring and management computer system 160, customer mobile device 170, and customer computing device 180 may, in some instances, be and/or include server computers, desktop computers, laptop computers, tablet computers, smart phones, or the like. As noted above, and as illustrated in greater detail below, any and/or all of customer portal computer system 120, account management computer system 130, administrative computer system 140, telephone agent support computer system 150, device monitoring and management computer system 160, customer mobile device 170, and customer computing device 180 may, in some instances, be special-purpose computing devices configured to perform specific functions.

Computing environment 100 also may include one or more computing platforms. For example, computing environment 100 may include customer authentication computing platform 110. As illustrated in greater detail below, customer authentication computing platform 110 may include one or more computing devices configured to perform one or more of the functions described herein. For example, customer authentication computing platform 110 may include one or more computers (e.g., laptop computers, desktop computers, servers, server blades, or the like).

Computing environment 100 also may include one or more networks, which may interconnect one or more of customer authentication computing platform 110, customer portal computer system 120, account management computer system 130, administrative computer system 140, telephone agent support computer system 150, device monitoring and management computer system 160, customer mobile device 170, and customer computing device 180. For example, computing environment 100 may include organization network 195 and public network 190. Organization network 195 and/or public network 190 may include one or more sub-networks (e.g., local area networks (LANs), wide area networks (WANs), or the like). Organization network 195 may be associated with a particular organization (e.g., a corporation, financial institution, educational institution, governmental institution, or the like) and may interconnect one or more computing devices associated with the organization. For example, customer authentication computing platform 110, customer portal computer system 120, account management computer system 130, administrative computer system 140, and telephone agent support computer system 150 may be associated with an organization (e.g., a financial institution), and organization network 195 may be associated with and/or operated by the organization, and may include one or more networks (e.g., LANs, WANs, virtual private networks (VPNs), or the like) that interconnect customer authentication computing platform 110, customer portal computer system 120, account management computer system 130, administrative computer system 140, and telephone agent support computer system 150 and one or more other computing devices and/or computer systems that are used by, operated by, and/or otherwise associated with the organization. Public network 190 may connect organization network 195 and/or one or more computing devices connected thereto (e.g., customer authentication computing platform 110, customer portal computer system 120, account management computer system 130, administrative computer system 140, and telephone agent support computer system 150) with one or more networks and/or computing devices that are not associated with the organization. For example, device monitoring and management computer system 160, customer mobile device 170, and customer computing device 180 might not be associated with an organization that operates organization network 195 (e.g., because device monitoring and management computer system 160, customer mobile device 170, and customer computing device 180 may be owned and/or operated by one or more entities different from the organization that operates organization network 195, such as one or more customers of the organization and/or vendors of the organization, rather than being owned and/or operated by the organization itself or an employee or affiliate of the organization), and public network 190 may include one or more networks (e.g., the internet) that connect device monitoring and management computer system 160, customer mobile device 170, and customer computing device 180 to organization network 195 and/or one or more computing devices connected thereto (e.g., customer authentication computing platform 110, customer portal computer system 120, account management computer system 130, administrative computer system 140, and telephone agent support computer system 150).

Figure 1B:
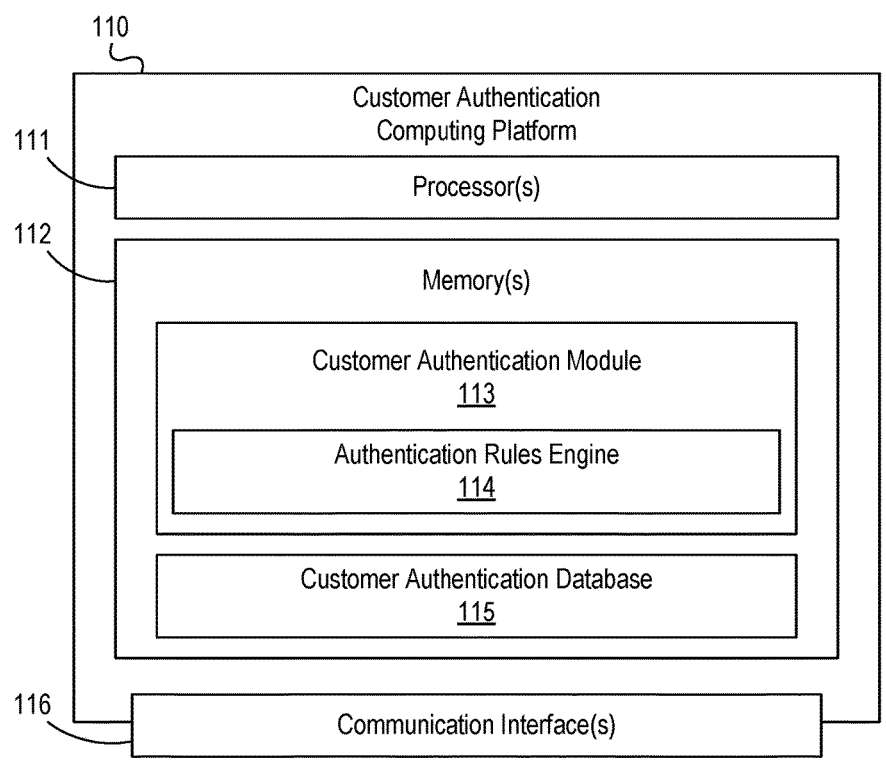

Referring to FIG. 1B, customer authentication computing platform 110 may include one or more processors 111, memory 112, and communication interface 116. A data bus may interconnect processor(s) 111, memory 112, and communication interface 116. Communication interface 116 may be a network interface configured to support communication between customer authentication computing platform 110 and one or more networks (e.g., organization network 195, public network 190, or the like). Memory 112 may include one or more program modules having instructions that when executed by processor(s) 111 cause customer authentication computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of customer authentication computing platform 110 and/or by different computing devices that may form and/or otherwise make up customer authentication computing platform 110. For example, memory 112 may include a customer authentication module 113 and a customer authentication database 115. Customer authentication module 113 may provide and/or perform one or more functions that may enable authentication of one or more customers of an organization, such as a financial institution, including one or more functions to recognize and authenticate mobile devices based on unique cross-channel bindings, as illustrated in greater detail below. In addition, customer authentication module 113 may include an authentication rules engine 114, which may evaluate, process, and/or apply one or more rules in recognizing and authenticating mobile devices based on unique cross-channel bindings. Customer authentication database 115 may store authentication information and/or other information that may be created and/or used by customer authentication computing platform 110 in performing one or more functions.

Figure 1C:
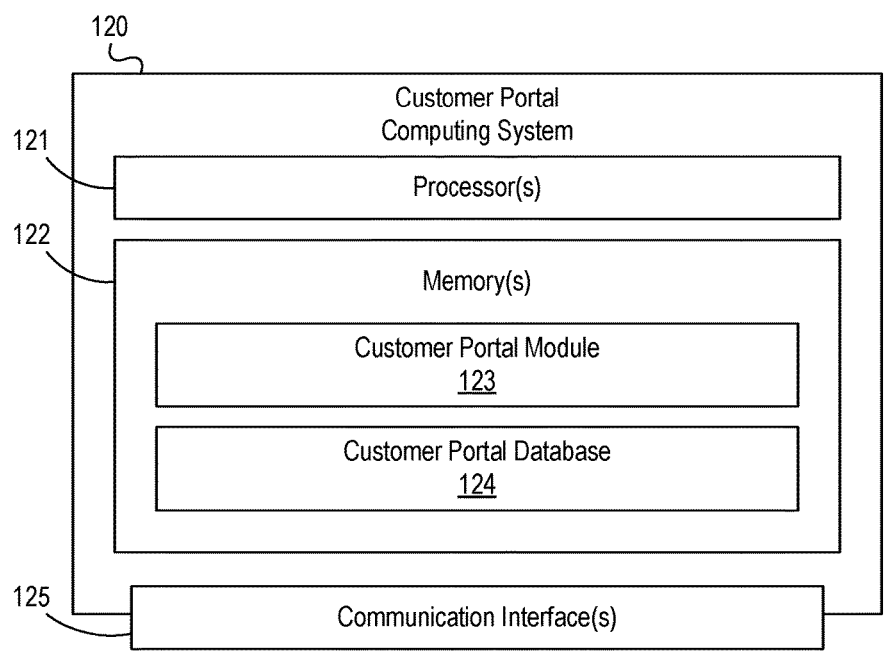

Referring to FIG. 1C, customer portal computer system 120 may include one or more processors 121, memory 122, and communication interface 125. A data bus may interconnect processor(s) 121, memory 122, and communication interface 125. Communication interface 125 may be a network interface configured to support communication between customer portal computer system 120 and one or more networks (e.g., organization network 195, public network 190, or the like). Memory 122 may include one or more program modules having instructions that when executed by processor(s) 121 cause customer portal computer system 120 to perform one or more functions described herein and/or one or more databases that may store and/or otherwise maintain information which may be used by such program modules and/or processor(s) 121. In some instances, the one or more program modules and/or databases may be stored by and/or maintained in different memory units of customer portal computer system 120 and/or by different computing devices that may form and/or otherwise make up customer portal computer system 120. For example, memory 122 may include a customer portal module 123 and a customer portal database 124. Customer portal module 123 may provide and/or perform one or more functions that may enable a customer portal, such as an online banking portal or website, to be provided to one or more customers of an organization and/or one or more computing devices used by such customers. Customer portal database 124 may store portal information and/or other information that may be created and/or used by customer portal computer system 120 in performing one or more functions.

Figure 1D:
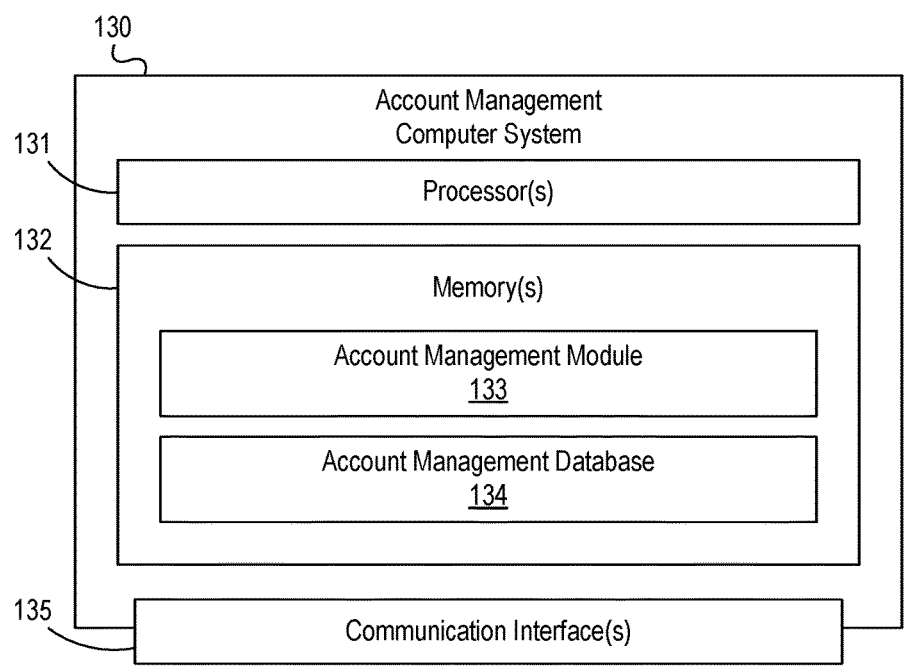

Referring to FIG. 1D, account management computer system 130 may include one or more processors 131, memory 132, and communication interface 135. A data bus may interconnect processor(s) 131, memory 132, and communication interface 135. Communication interface 135 may be a network interface configured to support communication between account management computer system 130 and one or more networks (e.g., organization network 195, public network 190, or the like). Memory 132 may include one or more program modules having instructions that when executed by processor(s) 131 cause account management computer system 130 to perform one or more functions described herein and/or one or more databases that may store and/or otherwise maintain information which may be used by such program modules and/or processor(s) 131. In some instances, the one or more program modules and/or databases may be stored by and/or maintained in different memory units of account management computer system 130 and/or by different computing devices that may form and/or otherwise make up account management computer system 130. For example, memory 132 may include an account management module 133 and an account management database 134. Account management module 133 may provide and/or perform one or more functions that may enable a customer of an organization to manage one or more aspects of an account. For instance, account management module 133 may provide and/or perform one or more functions that may enable a customer of a financial institution to manage one or more aspects of a financial account maintained by the financial institution for the customer (e.g., by allowing the customer to view account balance(s), request and/or execute bill pay transactions, transfer transactions, or the like). Account management database 134 may store account information and/or other information that may be created and/or used by account management computer system 130 in performing one or more functions.

Figure 1E:
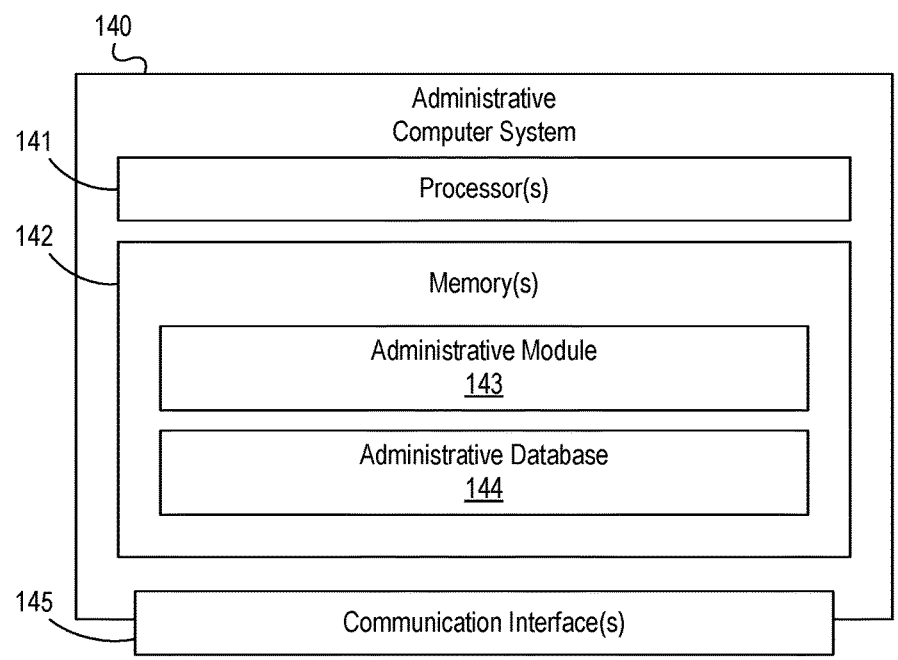

Referring to FIG. 1E, administrative computer system 140 may include one or more processors 141, memory 142, and communication interface 145. A data bus may interconnect processor(s) 141, memory 142, and communication interface 145. Communication interface 145 may be a network interface configured to support communication between administrative computer system 140 and one or more networks (e.g., organization network 195, public network 190, or the like). Memory 142 may include one or more program modules having instructions that when executed by processor(s) 141 cause administrative computer system 140 to perform one or more functions described herein and/or one or more databases that may store and/or otherwise maintain information which may be used by such program modules and/or processor(s) 141. In some instances, the one or more program modules and/or databases may be stored by and/or maintained in different memory units of administrative computer system 140 and/or by different computing devices that may form and/or otherwise make up administrative computer system 140. For example, memory 142 may include an administrative module 143 and an administrative database 144. Administrative module 143 may provide and/or perform one or more functions that may enable an administrative user to configure one or more computing devices included in computing environment 100. Administrative database 144 may store administrative information and/or other information that may be created and/or used by administrative computer system 140 in performing one or more functions.

Figure 1F:
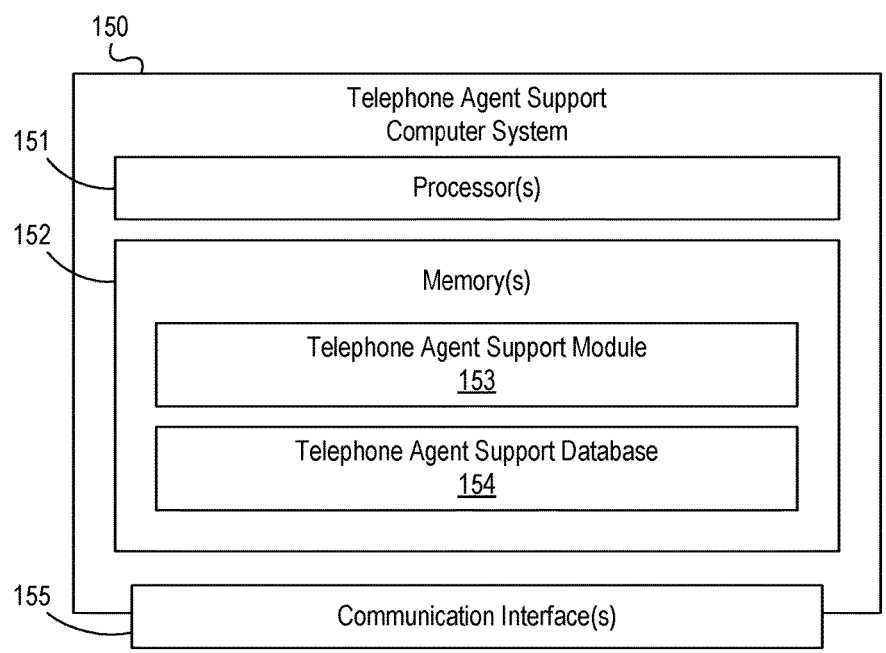

Referring to FIG. 1F, telephone agent support computer system 150 may include one or more processors 151, memory 152, and communication interface 155. A data bus may interconnect processor(s) 151, memory 152, and communication interface 155. Communication interface 155 may be a network interface configured to support communication between telephone agent support computer system 150 and one or more networks (e.g., organization network 195, public network 190, or the like). Memory 152 may include one or more program modules having instructions that when executed by processor(s) 151 cause telephone agent support computer system 150 to perform one or more functions described herein and/or one or more databases that may store and/or otherwise maintain information which may be used by such program modules and/or processor(s) 151. In some instances, the one or more program modules and/or databases may be stored by and/or maintained in different memory units of telephone agent support computer system 150 and/or by different computing devices that may form and/or otherwise make up telephone agent support computer system 150. For example, memory 152 may include a telephone agent support module 153 and a telephone agent support database 154. Telephone agent support module 153 may provide and/or perform one or more functions that may enable a telephone agent or customer service representative of an organization, such as a financial institution, to assist a caller (who may, e.g., be calling for assistance with one or more accounts, transactions, or the like). Telephone agent support database 154 may store telephone agent support information and/or other information that may be created and/or used by telephone agent support computer system 150 in performing one or more functions. In one or more arrangements, telephone agent support computer system 150 may be connected and/or linked to one or more IVR systems and/or other telephone systems operated by an organization. Additionally or alternatively, telephone agent support computer system 150 may support operations for a number of customer service representatives and/or call centers of an organization, and various customer service representatives may use individual computing devices that connect to and/or interface with telephone agent support computer system 150.

Figure 1G:
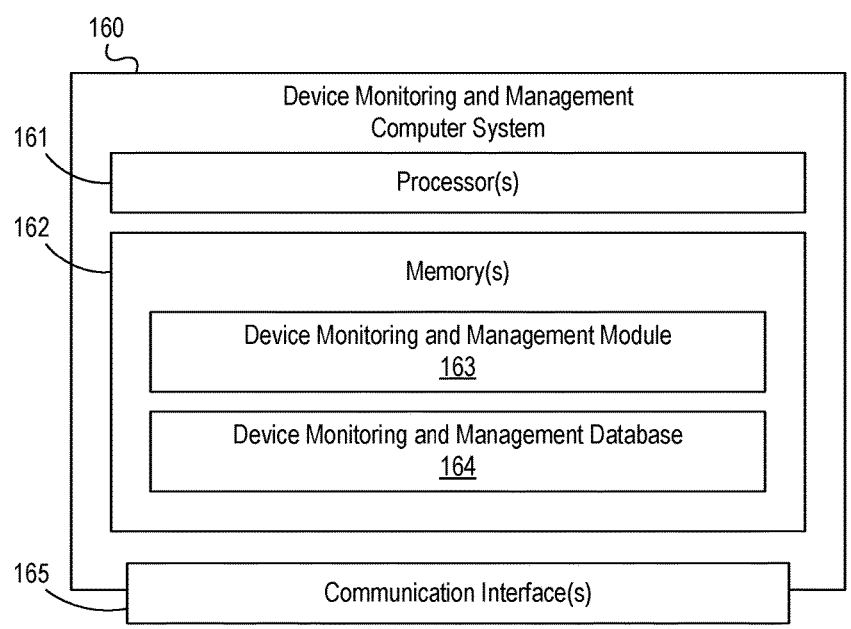

Referring to FIG. 1G, device monitoring and management computer system 160 may include one or more processors 161, memory 162, and communication interface 165. A data bus may interconnect processor(s) 161, memory 162, and communication interface 165. Communication interface 165 may be a network interface configured to support communication between device monitoring and management computer system 160 and one or more networks (e.g., organization network 195, public network 190, or the like). Memory 162 may include one or more program modules having instructions that when executed by processor(s) 161 cause device monitoring and management computer system 160 to perform one or more functions described herein and/or one or more databases that may store and/or otherwise maintain information which may be used by such program modules and/or processor(s) 161. In some instances, the one or more program modules and/or databases may be stored by and/or maintained in different memory units of device monitoring and management computer system 160 and/or by different computing devices that may form and/or otherwise make up device monitoring and management computer system 160. For example, memory 162 may include a device monitoring and management module 163 and a device monitoring and management database 164. Device monitoring and management module 163 may provide and/or perform one or more functions that may enable device monitoring and management computer system 160 to monitor and/or manage one or more mobile computing devices (which may, e.g., include requesting and/or monitoring device state information from one or more computing devices, probing one or more computing devices for device attribute information and/or other information, and/or performing other functions). Device monitoring and management database 164 may store device state information, device attribute information, and/or other information that may be created and/or used by device monitoring and management computer system 160 in performing one or more functions.

Figure 1H:
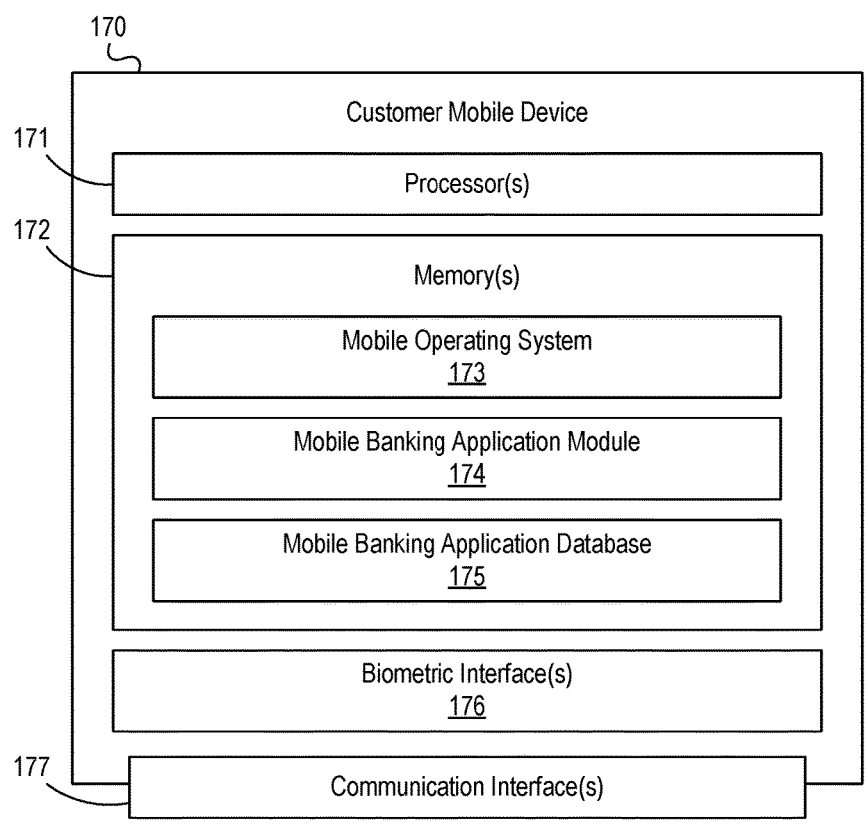

Referring to FIG. 1H, customer mobile device 170 may include one or more processors 171, memory 172, one or more biometric interfaces 176, and communication interface 177. A data bus may interconnect processor(s) 171, memory 172, biometric interface(s) 176, and communication interface 177. Communication interface 177 may be a network interface configured to support communication between customer mobile device 170 and one or more networks (e.g., organization network 195, public network 190, or the like). Biometric interface(s) 176 may include one or more input/output interfaces that may enable customer mobile device 170 to receive biometric input from a user of customer mobile device 170. For example, biometric interface(s) 176 may include one or more fingerprint readers, one or more microphones, one or more cameras, one or more retinal scanners, and/or one or more other input/output devices. Memory 172 may include one or more program modules having instructions that when executed by processor(s) 171 cause customer mobile device 170 to perform one or more functions described herein and/or one or more databases that may store and/or otherwise maintain information which may be used by such program modules and/or processor(s) 171. For example, memory 172 may include a mobile operating system 173, a mobile banking application module 174, and a mobile banking application database 175. Mobile operating system 173 may include software that provides and supports various functions of customer mobile device 170, such as providing a container in which a mobile banking application may execute, for instance. Mobile banking application module 174 may provide and/or perform one or more functions associated with a mobile banking application (which may, e.g., be used by a user of customer mobile device 170 to view and/or interact with financial account information). Mobile banking application database 175 may store mobile banking information and/or other information that may be created and/or used by customer mobile device 170 in performing one or more functions.

Figure 1I:
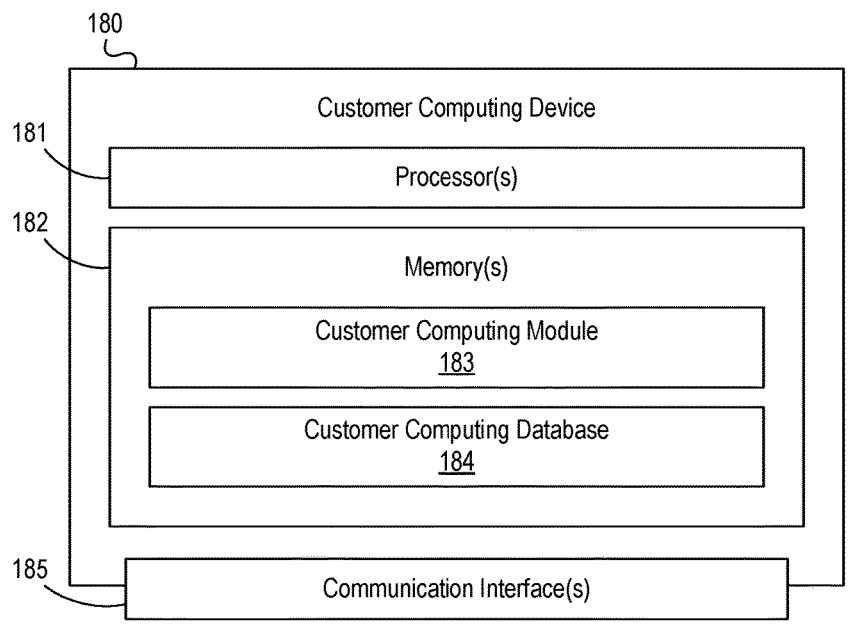

Referring to FIG. 1I, customer computing device 180 may include one or more processors 181, memory 182, and communication interface 185. A data bus may interconnect processor(s) 181, memory 182, and communication interface 185. Communication interface 185 may be a network interface configured to support communication between customer computing device 180 and one or more networks (e.g., organization network 195, public network 190, or the like). Memory 182 may include one or more program modules having instructions that when executed by processor(s) 181 cause customer computing device 180 to perform one or more functions described herein and/or one or more databases that may store and/or otherwise maintain information which may be used by such program modules and/or processor(s) 181. In some instances, the one or more program modules and/or databases may be stored by and/or maintained in different memory units of customer computing device 180 and/or by different computing devices that may form and/or otherwise make up customer computing device 180. For example, memory 182 may include a customer computing module 183 and a customer computing database 184. Customer computing module 183 may provide and/or perform one or more functions that may enable a customer of an organization, such as a financial institution, to access one or more user interfaces, such as a web portal, that may be provided by the organization. Customer computing database 184 may store customer computing information and/or other information that may be created and/or used by customer computing device 180 in performing one or more functions.

Figure 2A:
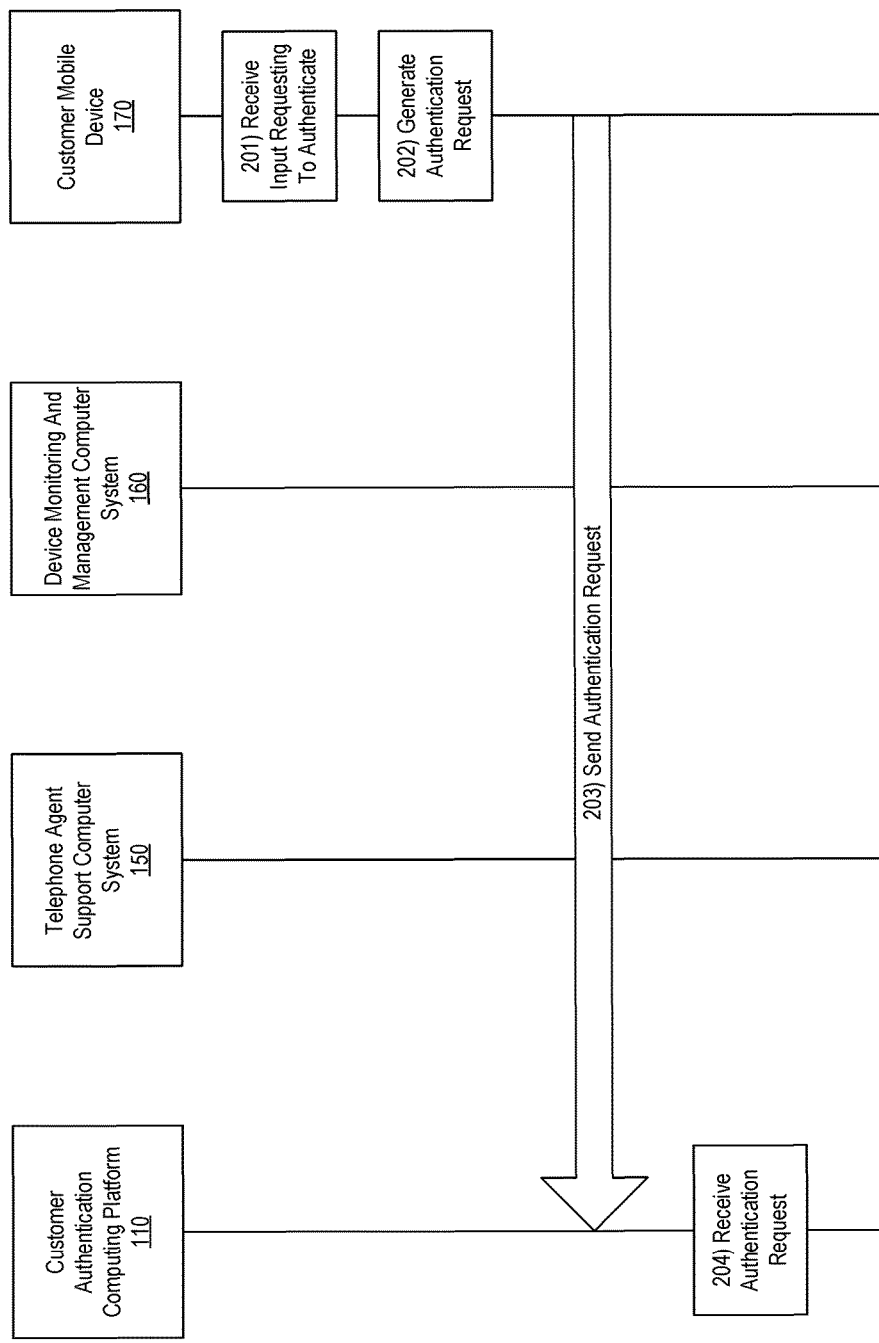

FIGS. 2A-2I depict an illustrative event sequence for recognizing and authenticating mobile devices based on unique cross-channel bindings in accordance with one or more example embodiments. Referring to FIG. 2A, at step 201, customer mobile device 170 may receive input requesting to authenticate. For example, at step 201, customer mobile device 170 may receive input from a user of customer mobile device 170 requesting to authenticate to an online banking portal, a mobile banking application, and/or the like. At step 202, customer mobile device 170 may generate an authentication request (e.g., based on the input requesting to authenticate received by customer mobile device 170 from the user of customer mobile device 170 at step 201). At step 203, customer mobile device 170 may send the authentication request to customer authentication computing platform 110.

At step 204, customer authentication computing platform 110 may receive the authentication request from customer mobile device 170. For example, at step 204, prior to receiving call information associated with a telephone call from a telephone agent support computer system (e.g., telephone agent support computer system 150), as discussed in greater detail below, customer authentication computing platform 110 may receive, via the communication interface (e.g., communication interface 116), and from a source device (which may, e.g., be customer mobile device 170, as discussed below), an authentication request. Such an authentication request may, for instance, originate from a mobile banking application executed on the source device (e.g., customer mobile device 170), an online banking portal accessed via a web browser on the source device (e.g., customer mobile device 170), and/or the like.

Referring to FIG. 2B, at step 205, customer authentication computing platform 110 may generate one or more authentication prompts (e.g., based on the authentication requested received from customer mobile device 170 at step 204, based on one or more authentication rules, and/or the like). For example, at step 205, based on receiving the authentication request from the source device (e.g., customer mobile device 170), customer authentication computing platform 110 may generate one or more authentication prompts for the source device (e.g., customer mobile device 170). In generating such authentication prompts, customer authentication computing platform 110 may, for example, create and/or form one or more prompts to be answered by the user of customer mobile device 170 based on one or more authentication prompt templates.

At step 206, customer authentication computing platform 110 may provide the one or more authentication prompts. For example, at step 206, customer authentication computing platform 110 may provide the one or more authentication prompts to the source device (e.g., customer mobile device 170). In providing the one or more authentication prompts at step 206, customer authentication computing platform 110 may, for example, send one or more authentication prompts to customer mobile device 170 that request the user of customer mobile device 170 to enter and/or otherwise provide a username, a password, one or more responses to one or more security questions, a one-time passcode, biometric input, and/or the like. At step 207, customer authentication computing platform 110 may validate one or more responses to the one or more authentication prompts. For example, at step 207, customer authentication computing platform 110 may validate one or more responses to the one or more authentication prompts provided to the source device (e.g., customer mobile device 170). In validating the one or more responses to the one or more authentication prompts, customer authentication computing platform 110 may, for instance, determine whether a username and/or password entered by the user of customer mobile device 170 are correct, whether an indication of biometric input received from the user of customer mobile device 170 was determined to be valid by customer mobile device 170, whether one or more responses to one or more challenge questions entered by the user of customer mobile device 170 are valid, whether a one-time passcode entered by the user of customer mobile device 170 is valid, and/or whether other authentication input entered and/or otherwise provided by the user of customer mobile device 170 is valid. If the one or more responses to the one or more authentication prompts are determined by customer authentication computing platform 110 to be invalid and/or otherwise incorrect, customer authentication computing platform 110 may generate and/or send one or more error messages to customer mobile device 170 and/or may prevent and/or deny access to customer mobile device 170. Alternatively, if the one or more responses to the one or more authentication prompts are determined by customer authentication computing platform 110 to be valid and/or otherwise correct, the event sequence may continue as illustrated in FIG. 2B (e.g., and customer authentication computing platform 110 may allow and/or otherwise provide access to customer mobile device 170, as illustrated below).

At step 208, customer authentication computing platform 110 may provide access to a user account. For example, at step 208, based on validating the one or more responses to the one or more authentication prompts provided to the source device (e.g., customer mobile device 170), customer authentication computing platform 110 may provide the source device (e.g., customer mobile device 170) with access to user account information. For instance, customer authentication computing platform 110 may provide the source device (e.g., customer mobile device 170) with access to user account information associated with a user account linked to the source device (e.g., customer mobile device 170). In providing access to such information, customer authentication computing platform 110 may, for instance, send, provide, and/or allow customer mobile device 170 and/or the user of customer mobile device 170 to access account information via a customer portal, an online banking portal (which may, e.g., be provided by customer portal computer system 120 and/or may allow the user of customer mobile device 170 to access and/or view account information maintained by account management computer system 130), a mobile banking application (which may, e.g., interact and/or exchange data with customer portal computer system 120 and/or may allow the user of customer mobile device 170 to access and/or view account information maintained by account management computer system 130), and/or the like. Such account information may, for instance, include account balance information, transaction history information, and/or other information associated with a user account linked to the source device (e.g., customer mobile device 170).

Figure 2C:
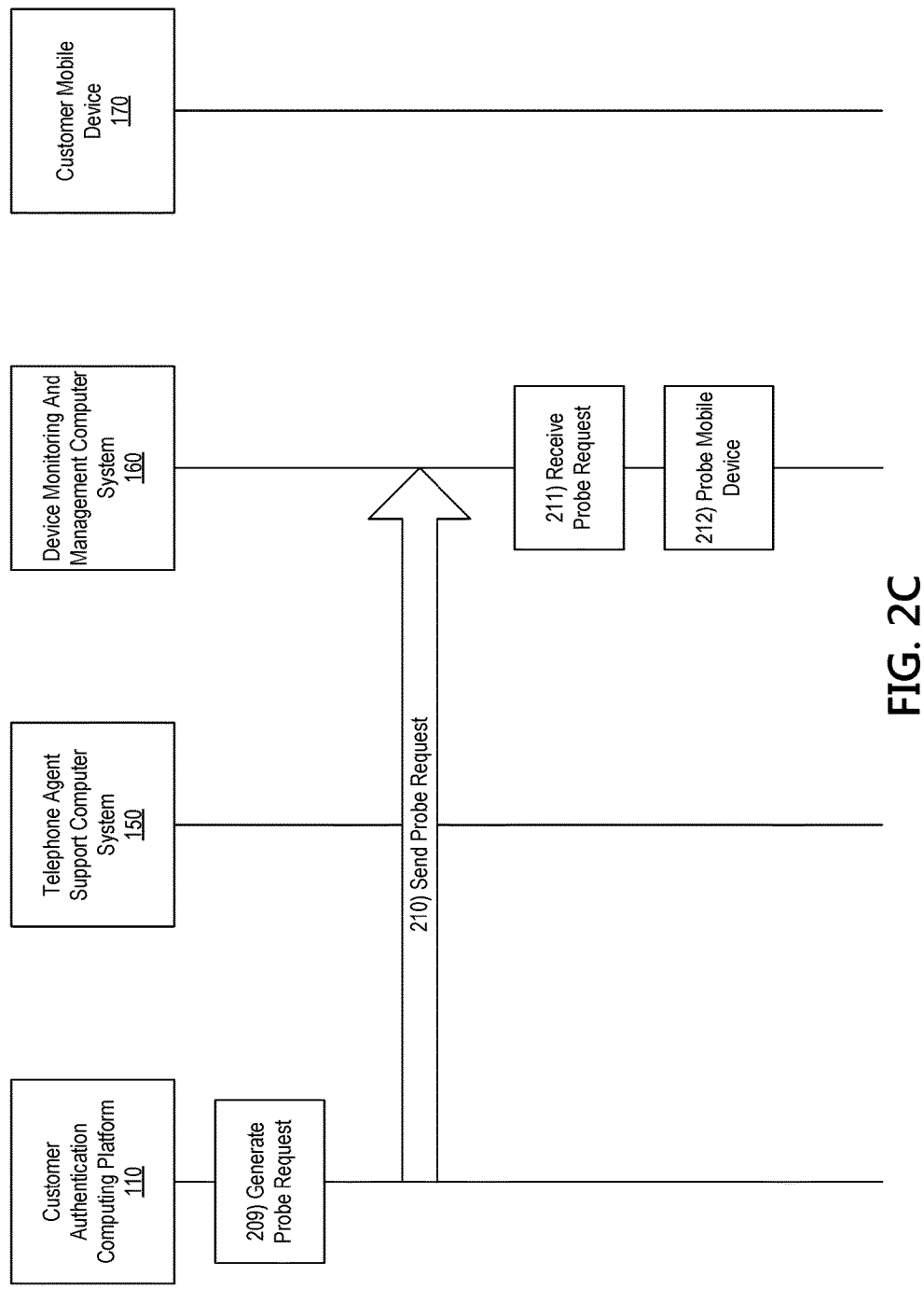

Referring to FIG. 2C, at step 209, customer authentication computing platform 110 may generate a probe request. For example, at step 209, prior to receiving call information associated with a telephone call from a telephone agent support computer system (e.g., telephone agent support computer system 150), as discussed in greater detail below, and after providing the source device (e.g., customer mobile device 170) with access to user account information, customer authentication computing platform 110 may generate a probe request for the source device (e.g., customer mobile device 170). In generating such a probe request, customer authentication computing platform 110 may create and/or form a data message and/or data structure (which may, e.g., be sent to device monitoring and management computer system 160) that includes one or more identifiers received from the source device (e.g., customer mobile device 170) during authentication process (e.g., at one or more of steps 201 to 208), such as a network address of the source device (e.g., customer mobile device 170), a device name of the source device (e.g., customer mobile device 170), and/or other information associated with the source device (e.g., customer mobile device 170). Such information may, for instance, enable device monitoring and management computer system 160 to inspect and/or otherwise probe customer mobile device 170, as discussed in greater detail below.

At step 210, customer authentication computing platform 110 may send the probe request to device monitoring and management computer system 160. For example, at step 210, customer authentication computing platform 110 may send, via the communication interface (e.g., communication interface 116), and to a device monitoring and management computer system (e.g., device monitoring and management computer system 160), the probe request generated for the source device (e.g., customer mobile device 170). At step 211, device monitoring and management computer system 160 may receive the probe request from customer authentication computing platform 110. At step 212, device monitoring and management computer system 160 may probe customer mobile device 170. In probing customer mobile device 170, device monitoring and management computer system 160 may, for instance, connect to, request, and/or obtain one or more device attributes from customer mobile device 170 and/or other information from customer mobile device 170.

Figure 2D:
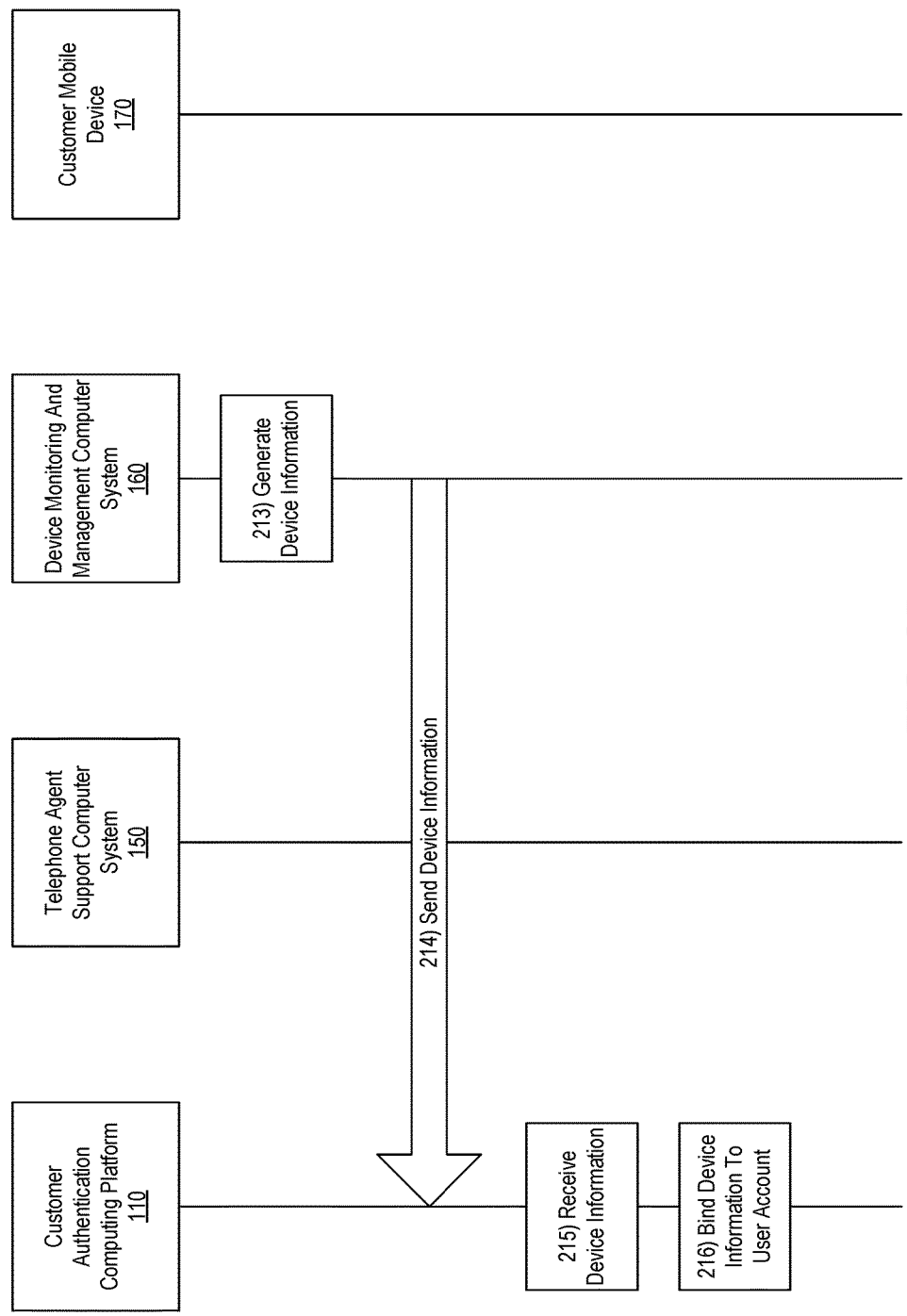

Referring to FIG. 2D, at step 213, device monitoring and management computer system 160 may generate device information for customer mobile device 170. For example, at step 213, device monitoring and management computer system 160 may generate device information for customer mobile device 170 based on the one or more device attributes obtained from customer mobile device 170 and/or the other information obtained from customer mobile device 170. In generating such device information for customer mobile device 170, customer authentication computing platform 110 may, for example, derive a unique device identifier for customer mobile device 170 and/or other characteristics information for customer mobile device 170 based on the one or more device attributes obtained from customer mobile device 170 and/or the other information obtained from customer mobile device 170. At step 214, device monitoring and management computer system 160 may send the device information to customer authentication computing platform 110. For example, at step 214, device monitoring and management computer system 160 may send, to customer authentication computing platform 110 a unique device identifier generated by device monitoring and management computer system 160 for customer mobile device 170, a mobile telephone number used by customer mobile device 170 and obtained by device monitoring and management computer system 160 from customer mobile device 170, and/or other device information associated with customer mobile device 170.

At step 215, customer authentication computing platform 110 may receive the device information. For example, at step 215, customer authentication computing platform 110 may receive, via the communication interface (e.g., communication interface 116), and from the device monitoring and management computer system (e.g., device monitoring and management computer system 160), device information for the source device (e.g., customer mobile device 170). At step 216, customer authentication computing platform 110 may bind the device information to the user account to which customer authentication computing platform 110 provided access (e.g., at step 208). For example, at step 216, customer authentication computing platform 110 may bind the device information for the source device (e.g., customer mobile device 170) to the user account to link the source device (e.g., customer mobile device 170) to the user account. In binding the device information for the source device (e.g., customer mobile device 170) to the user account, customer authentication computing platform 110 may, for instance, store information linking a unique device identifier of the source device (e.g., customer mobile device 170) to a user account identifier associated with the user account to which customer authentication computing platform 110 provided access at step 208. Additionally or alternatively, in binding the device information for the source device (e.g., customer mobile device 170) to the user account, customer authentication computing platform 110 may, for instance, store information linking a mobile telephone number of the source device (e.g., customer mobile device 170) to a user account identifier associated with the user account to which customer authentication computing platform 110 provided access at step 208.

In some embodiments, binding the device information for the source device to the user account to link the source device to the user account may include creating the binding information maintained by the computing platform for the source device based on the device information for the source device received from the device monitoring and management computer system. For example, in binding the device information for the source device (e.g., customer mobile device 170) to the user account to link the source device (e.g., customer mobile device 170) to the user account, customer authentication computing platform 110 may create the binding information maintained by the computing platform (e.g., customer authentication computing platform 110) for the source device (e.g., customer mobile device 170) based on the device information for the source device (e.g., customer mobile device 170) received from the device monitoring and management computer system (e.g., device monitoring and management computer system 160). For instance, customer authentication computing platform 110 may create, update, store, and/or otherwise modify the binding information for customer mobile device 170 based on the device information received from device monitoring and management computer system 160 regarding customer mobile device 170.

As illustrated in the subsequent steps of the example event sequence, customer authentication computing platform 110 may use this binding information in recognizing and/or authenticating customer mobile device 170 in the future when customer mobile device 170 is used by the user of customer mobile device 170 to place a telephone call to a telephone support channel of an organization operating customer authentication computing platform 110, such as a financial institution operating customer authentication computing platform 110.

Referring to FIG. 2E, at step 217, customer mobile device 170 may receive input requesting to dial in to a telephone support channel associated with the organization operating customer authentication computing platform 110. At step 218, customer mobile device 170 may place a telephone call to the telephone support channel associated with the organization operating customer authentication computing platform 110. At step 219, telephone agent support computer system 150 may receive the telephone call placed by customer mobile device 170. In receiving the telephone call placed by customer mobile device 170, telephone agent support computer system 150 may receive the telephone call directly in some instances, while in other instances the telephone call placed by customer mobile device 170 may be received by an IVR system or other telephone system that is integrated with and/or connected to telephone agent support computer system 150. At step 220, telephone agent support computer system 150 may send call information associated with the telephone call to customer authentication computing platform 110. In sending the call information associated with the telephone call to customer authentication computing platform 110, telephone agent support computer system 150 may, for example, send customer authentication computing platform 110 an incoming telephone number associated with the call, automatic number identification (ANI) information associated with the call, and/or other information associated with the call.

Figure 2F:
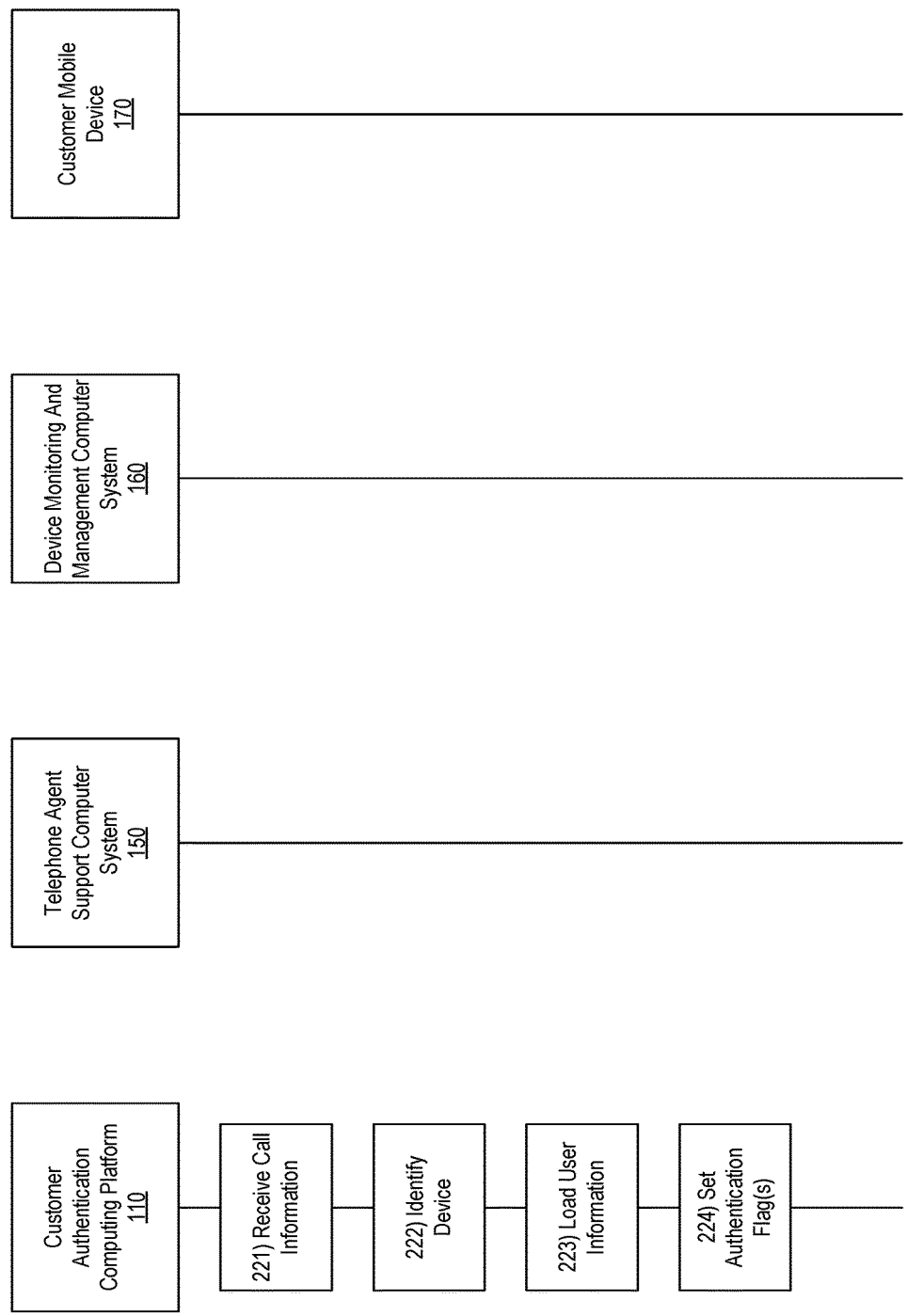

Referring to FIG. 2F, at step 221, customer authentication computing platform 110 may receive the call information from telephone agent support computer system 150. For example, at step 221, customer authentication computing platform 110 may receive, via the communication interface (e.g., communication interface 116), and from a telephone agent support computer system associated with a telephone agent channel (e.g., telephone agent support computer system 150), call information associated with a telephone call received by the telephone agent support computer system associated with the telephone agent channel (e.g., telephone agent support computer system 150).

At step 222, customer authentication computing platform 110 may identify the device that placed the call received by telephone agent support computer system 150. For example, at step 222, customer authentication computing platform 110 may identify a source device (e.g., customer mobile device 170) that placed the telephone call received by the telephone agent support computer system associated with the telephone agent channel (e.g., telephone agent support computer system 150), based on binding information maintained by the computing platform (e.g., customer authentication computing platform 110) for the source device (e.g., customer mobile device 170). In identifying the device that placed the call received by telephone agent support computer system 150, customer authentication computing platform 110 may, for instance, obtain a unique device identifier from the device that placed the call and/or request such an identifier from device monitoring and management computer system 160. Subsequently, customer authentication computing platform 110 may verify that the device identifier obtained from and/or corresponding to the device that placed the call matches a unique device identifier (which may, e.g., be stored in the binding information) corresponding to the telephone number from which the call was received and/or matches a user account to which the caller using the device is requesting access. Customer authentication computing platform 110 may, for example, be able to perform such matching and/or verification if one or more records exist in the binding information for the specific phone number and/or device identifier associated with the device that placed the call. If such records do not exist in the binding information (e.g., because the device that placed the call has not been previously used to access online banking, mobile banking, and/or otherwise has not been authenticated via another channel different from the telephone support channel), then customer authentication computing platform 110 may generate and/or send a message to telephone agent support computer system 150 indicating that the device that placed the call cannot be identified and/or that telephone agent support computer system 150 and/or the user of telephone agent support computer system 150 must manually authenticate the caller using the device.

In some embodiments, the binding information maintained by the computing platform for the source device may include a unique device identifier for the source device. For example, the binding information maintained by the computing platform (e.g., customer authentication computing platform 110) for the source device (e.g., customer mobile device 170) may include a unique device identifier for the source device (e.g., customer mobile device 170). Such a unique device identifier may, for instance, be and/or include a unique string of characters that is generated by device monitoring and management computer system 160 and used and/or stored by customer authentication computing platform 110 in identifying, recognizing, and/or authenticating the device (e.g., customer mobile device 170) across various channels via which the device (e.g., customer mobile device 170) may access customer authentication computing platform 110 and/or one or more computer systems associated with the organization operating customer authentication computing platform 110.

In some embodiments, the binding information maintained by the computing platform for the source device may include account profile information linking the unique device identifier for the source device to the user account. For example, the binding information maintained by the computing platform (e.g., customer authentication computing platform 110) for the source device (e.g., customer mobile device 170) may include account profile information linking the unique device identifier for the source device (e.g., customer mobile device 170) to the user account. In some instances, the user account may be a mobile banking account linked to one or more financial accounts maintained by a financial institution operating customer authentication computing platform 110.

In some embodiments, the unique device identifier for the source device may be derived by a device monitoring and management computer system based on one or more attributes of the source device. For example, the unique device identifier for the source device (e.g., customer mobile device 170) may be derived by a device monitoring and management computer system (e.g., device monitoring and management computer system 160) based on one or more attributes of the source device (e.g., customer mobile device 170). In some instances, the one or more attributes of the source device (e.g., customer mobile device 170) that may be used by the device monitoring and management computer system (e.g., device monitoring and management computer system 160) in deriving the unique device identifier for the source device (e.g., customer mobile device 170) may include a firmware version of the source device (e.g., customer mobile device 170), a basic input/output system (BIOS) version of the source device (e.g., customer mobile device 170), an operating system version of the source device (e.g., customer mobile device 170), a hardware configuration of the source device (e.g., customer mobile device 170), a software configuration of the source device (e.g., customer mobile device 170), one or more serial numbers for one or more hardware devices of the source device (e.g., customer mobile device 170), one or more serial numbers for one or more software components of the source device (e.g., customer mobile device 170), and/or the like.

In some embodiments, the binding information maintained by the computing platform for the source device may include a telephone number assigned to the source device. For example, the binding information maintained by the computing platform (e.g., customer authentication computing platform 110) for the source device (e.g., customer mobile device 170) may include a telephone number assigned to the source device (e.g., customer mobile device 170).

In some embodiments, identifying the source device that placed the telephone call received by the telephone agent support computer system associated with the telephone agent channel may include matching a telephone number associated with the telephone call received by the telephone agent support computer system to a telephone number associated with a unique device identifier of the source device included in the binding information maintained by the computing platform for the source device. For example, in identifying the source device (e.g., customer mobile device 170) that placed the telephone call received by the telephone agent support computer system associated with the telephone agent channel (e.g., telephone agent support computer system 150), customer authentication computing platform 110 may match a telephone number associated with the telephone call received by the telephone agent support computer system (e.g., telephone agent support computer system 150) to a telephone number associated with a unique device identifier of the source device (e.g., customer mobile device 170) included in the binding information maintained by the computing platform (e.g., customer authentication computing platform 110) for the source device (e.g., customer mobile device 170).

At step 223, customer authentication computing platform 110 may load user information associated with the device that placed the call. For example, at step 223, based on identifying the source device (e.g., customer mobile device 170) that placed the telephone call received by the telephone agent support computer system associated with the telephone agent channel (e.g., telephone agent support computer system 150), customer authentication computing platform 110 may load user information associated with a user account linked to the source device (e.g., customer mobile device 170). In loading user information associated with a user account linked to the source device (e.g., customer mobile device 170), customer authentication computing platform 110 may, for example, load a customer name associated with the user account linked to the source device (e.g., customer mobile device 170), account information associated with the user account linked to the source device (e.g., customer mobile device 170) (which may, e.g., include account balance information, transaction history information, and/or other account information), and/or other information associated with the user account linked to the source device (e.g., customer mobile device 170).

At step 224, customer authentication computing platform 110 may set one or more authentication flags. For example, at step 224, customer authentication computing platform 110 may set one or more authentication flags for the user account linked to the source device (e.g., customer mobile device 170) based on the binding information maintained by the computing platform (e.g., customer authentication computing platform 110) for the source device (e.g., customer mobile device 170). Such authentication flags may, for instance, enable and/or cause customer authentication computing platform 110 to provide the source device (e.g., customer mobile device 170) with limited and/or specific access to one or more aspects of the user account linked to the source device (e.g., customer mobile device 170). For example, the authentication flags may enable and/or cause customer authentication computing platform 110 to provide the source device (e.g., customer mobile device 170) with varying levels of access to the user account depending on which authentication flags are set by customer authentication computing platform 110 (e.g., one or more particular flags may provide for and/or correspond to a relatively low level of access, one or more particular flags may provide for and/or correspond to a medium level of access, and one or more particular flags may provide for and/or correspond to a relatively high or full level of access). In some instances, customer authentication computing platform 110 may set the one or more authentication flags based on the authentication history of the device (e.g., customer mobile device 170). For instance, the greater the number of successful authentications of the device (e.g., customer mobile device 170) on one or more particular channels (e.g., an online banking channel, a mobile banking channel, and/or the like), the higher the level of access that customer authentication computing platform 110 may allow for the device (e.g., customer mobile device 170) when setting the one or more authentication flags for the device (e.g., customer mobile device 170).

Referring to FIG. 2G, at step 225, customer authentication computing platform 110 may send the user information to telephone agent support computer system 150. For example, at step 225, customer authentication computing platform 110 may send, via the communication interface (e.g., communication interface 116), and to the telephone agent support computer system associated with the telephone agent channel (e.g., telephone agent support computer system 150), the user information associated with the user account linked to the source device (e.g., customer mobile device 170). By sending the user information to telephone agent support computer system 150, customer authentication computing platform 110 may, for instance, pre-load and/or provide customer profile information and/or other customer-specific information to a customer service representative who may be using and/or otherwise interacting with telephone agent support computer system 150 and assisting the customer using customer mobile device 170. In addition, customer authentication computing platform 110 may send authentication information and/or other authentication information to telephone agent support computer system 150, as discussed below, to enable the customer service representative who may be using and/or otherwise interacting with telephone agent support computer system 150 to assist the customer using customer mobile device 170.

In some embodiments, sending the user information associated with the user account linked to the source device to the telephone agent support computer system may include sending, to the telephone agent support computer system, customer name information associated with the user account linked to the source device, customer account information associated with the user account linked to the source device, and transaction history information associated with the user account linked to the source device. For example, in sending the user information associated with the user account linked to the source device (e.g., customer mobile device 170) to the telephone agent support computer system (e.g., telephone agent support computer system 150), customer authentication computing platform 110 may send, to the telephone agent support computer system (e.g., telephone agent support computer system 150), customer name information associated with the user account linked to the source device (e.g., customer mobile device 170), customer account information associated with the user account linked to the source device (e.g., customer mobile device 170), and transaction history information associated with the user account linked to the source device (e.g., customer mobile device 170).

At step 226, customer authentication computing platform 110 may send authentication information to telephone agent support computer system 150 based on the one or more authentication flags set by customer authentication computing platform 110. For example, at step 226, customer authentication computing platform 110 may send, via the communication interface (e.g., communication interface 116), and to the telephone agent support computer system associated with the telephone agent channel (e.g., telephone agent support computer system 150), authentication information based on the one or more authentication flags set for the user account linked to the source device (e.g., customer mobile device 170). In some instances, the authentication information may include information identifying and/or specifying the one or more authentication flags set for the user account linked to the source device (e.g., customer mobile device 170). Additionally or alternatively, the authentication information may include information identifying and/or specifying a level of access to be provided as a result of and/or in accordance with the one or more authentication flags set for the user account linked to the source device (e.g., customer mobile device 170). For instance, the authentication information may include information indicating that the caller using the source device (e.g., customer mobile device 170) has been authenticated to perform a first type of transaction (e.g., balance inquiry transaction) but not a second type of transaction (e.g., funds transfer transactions).

In some instances, the authentication information may be created by customer authentication computing platform 110 based on the one or more authentication flags set for the user account linked to the source device (e.g., customer mobile device 170). Such authentication information may, for example, be configured to cause telephone agent support computer system 150 and/or the user of telephone agent support computer system 150 to allow limited and/or specific access to the user account in accordance with the one or more authentication flags set for the user account linked to the source device (e.g., customer mobile device 170). For instance, such authentication information may include one or more authentication status indicators that may allow the caller using the source device (e.g., customer mobile device 170) to have a limited and/or specific level and/or amount of access to user account linked to the source device (e.g., customer mobile device 170) without being prompted to and/or required to provide additional authentication credentials for verification by customer authentication computing platform 110.

In some instances, the user account linked to the source device may be an online banking user account associated with an online banking channel of a financial institution, and the telephone agent channel may be a telephone support channel of the financial institution. For example, the user account linked to the source device (e.g., customer mobile device 170) may be an online banking user account associated with an online banking channel of a financial institution (which may, e.g., be operating customer authentication computing platform 110), and the telephone agent channel (which may, e.g., be provided by telephone agent support computer system 150) may be a telephone support channel of the financial institution.

In some embodiments, setting the one or more authentication flags for the user account linked to the source device based on the binding information maintained by the computing platform for the source device may include setting a first authentication flag allowing a first level of access to the user account based on a device authentication score associated with the source device being below a first threshold; setting a second authentication flag allowing a second level of access to the user account based on the device authentication score associated with the source device being at or above the first threshold and below a second threshold; and setting a third authentication flag allowing a third level of access to the user account based on the device authentication score associated with the source device being at or above the second threshold. For example, in setting the one or more authentication flags for the user account linked to the source device (e.g., customer mobile device 170) based on the binding information maintained by the computing platform (e.g., customer authentication computing platform 110) for the source device (e.g., customer mobile device 170), customer authentication computing platform 110 may set one or more authentication flags that provide varying levels of access to the user account depending on a device authentication score that customer authentication computing platform 110 may calculate for the source device (e.g., customer mobile device 170). Customer authentication computing platform 110 may, for instance, calculate such a device authentication score based on one or more factors associated with the source device (e.g., customer mobile device 170), which may include an amount of time elapsed since the source device (e.g., customer mobile device 170) successfully authenticated with customer authentication computing platform 110 via another channel different from the telephone support channel, such as online banking channel, a mobile banking channel, and/or the like. For instance, customer authentication computing platform 110 may set a first authentication flag allowing a first level of access to the user account based on a device authentication score associated with the source device (e.g., customer mobile device 170) being below a first threshold. In addition, customer authentication computing platform 110 may set a second authentication flag allowing a second level of access to the user account based on the device authentication score associated with the source device (e.g., customer mobile device 170) being at or above the first threshold and below a second threshold. In addition, customer authentication computing platform 110 may set a third authentication flag allowing a third level of access to the user account based on the device authentication score associated with the source device (e.g., customer mobile device 170) being at or above the second threshold.

At step 227, telephone agent support computer system 150 may receive a request for a balance inquiry (e.g., from the user of telephone agent support computer system 150, based on a request submitted to the user of telephone agent support computer system 150 by the caller). At step 228, telephone agent support computer system 150 may send the request for the balance inquiry to customer authentication computing platform 110.

Figure 2H:
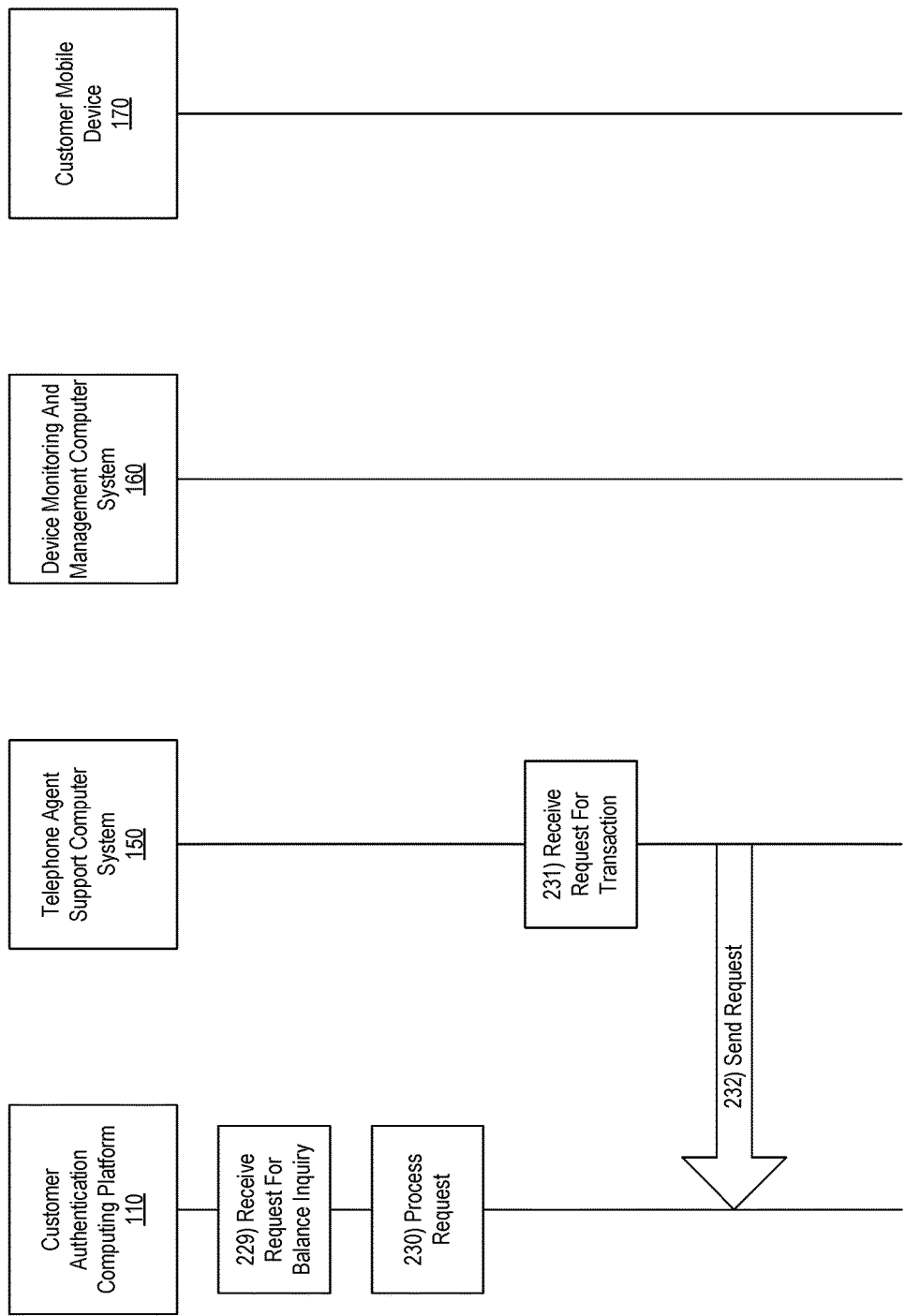
Figure 3:
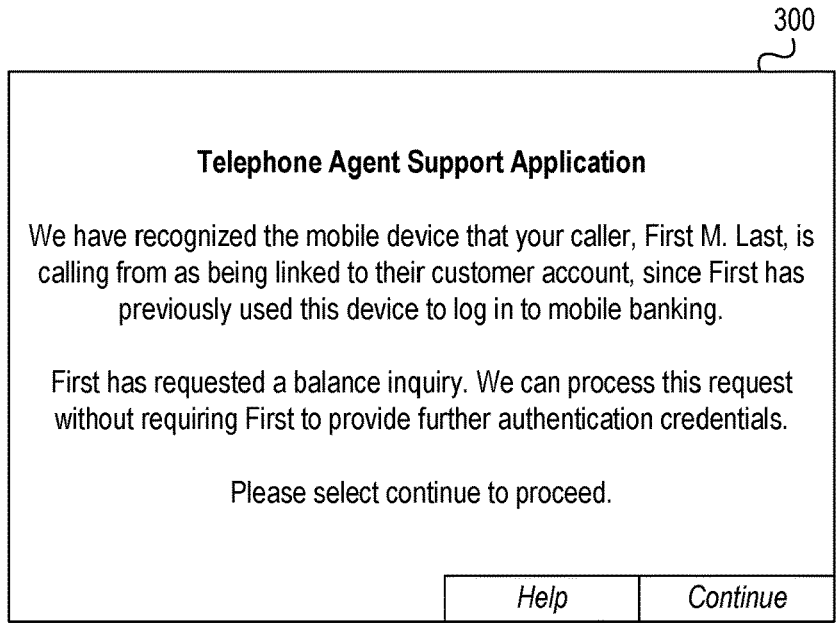
FIGS. 3 and 4 depict example graphical user interfaces for recognizing and authenticating mobile devices based on unique cross-channel bindings in accordance with one or more example embodiments.

Referring to FIG. 2H, at step 229, customer authentication computing platform 110 may receive the request for the balance inquiry from telephone agent support computer system 150. At step 230, customer authentication computing platform 110 may process the request for the balance inquiry. For example, at step 230, customer authentication computing platform 110 may process the request for the balance inquiry based on the one or more authentication flags set for the user account linked to the source device (e.g., customer mobile device 170). For instance, if the balance inquiry is not allowed and/or otherwise prohibited as a result of and/or in accordance with the one or more authentication flags set for the user account linked to the source device (e.g., customer mobile device 170), then customer authentication computing platform 110 may generate and/or send an error message to telephone agent support computer system 150 and/or a prompt to telephone agent support computer system 150 indicating that the caller must provide additional authentication credentials before the balance inquiry can be executed. Alternatively, if the balance inquiry is allowed as a result of and/or in accordance with the one or more authentication flags set for the user account linked to the source device (e.g., customer mobile device 170), then customer authentication computing platform 110 may execute the balance inquiry by loading account balance information from account management computer system 130 and providing the account balance information to telephone agent support computer system 150. In processing and/or executing the balance inquiry, customer authentication computing platform 110 may cause telephone agent support computer system 150 to display and/or otherwise present a graphical user interface similar to graphical user interface 300, which is illustrated in FIG. 3. As seen in FIG. 3, graphical user interface 300 may include information notifying the user of telephone agent support computer system 150 that the caller's requested balance inquiry can be processed and/or executed by customer authentication computing platform 110 without requiring the caller to provide additional authentication credentials, since the device being used by the caller to place the call has been recognized and/or authenticated by customer authentication computing platform 110 based on binding information maintained by customer authentication computing platform 110 (e.g., as illustrated above).

As discussed above, customer authentication computing platform 110 may provide different levels of access in different instances after identifying a device and without requiring additional authentication credentials. In some instances, however, even after a device is authenticated, customer authentication computing platform 110 may require telephone agent support computer system 150 and/or a caller interacting with a user of telephone agent support computer system 150 to provide additional authentication credentials before a transaction can be executed, as illustrated below.

At step 231, telephone agent support computer system 150 may receive a request for a transaction. For example, at step 231, telephone agent support computer system 150 may receive a request for a funds transfer transaction from a user of telephone agent support computer system 150 based on a caller request. At step 232, telephone agent support computer system 150 may send the request for the transaction to customer authentication computing platform 110.

Figure 4:
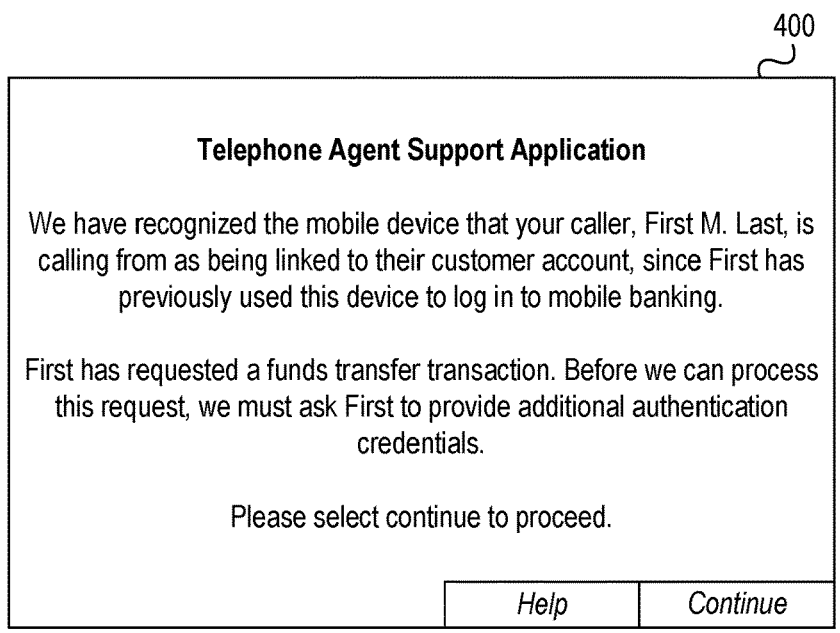

Referring to FIG. 2I, at step 233, customer authentication computing platform 110 may receive the request for the transaction from telephone agent support computer system 150. At step 234, customer authentication computing platform 110 may process the request for the transaction. For example, at step 234, customer authentication computing platform 110 may process the request for the funds transfer transaction based on the one or more authentication flags set for the user account linked to the source device (e.g., customer mobile device 170). For instance, if the funds transfer transaction is not allowed and/or otherwise prohibited as a result of and/or in accordance with the one or more authentication flags set for the user account linked to the source device (e.g., customer mobile device 170), then customer authentication computing platform 110 may generate and/or send an error message to telephone agent support computer system 150 and/or a prompt to telephone agent support computer system 150 indicating that the caller must provide additional authentication credentials before the funds transfer transaction can be executed. Alternatively, if the funds transfer transaction is allowed as a result of and/or in accordance with the one or more authentication flags set for the user account linked to the source device (e.g., customer mobile device 170), then customer authentication computing platform 110 may execute the funds transfer transaction by sending one or more commands to account management computer system 130 to request and/or execute the transaction and by providing a confirmation to telephone agent support computer system 150. In processing the funds transfer transaction and/or prompting telephone agent support computer system 150 to ask the caller to provide additional authentication credentials, customer authentication computing platform 110 may cause telephone agent support computer system 150 to display and/or otherwise present a graphical user interface similar to graphical user interface 400, which is illustrated in FIG. 4. As seen in FIG. 4, graphical user interface 400 may include information notifying the user of telephone agent support computer system 150 that the caller's requested funds transfer transaction can only be processed and/or executed by customer authentication computing platform 110 if the caller provides additional valid authentication credentials, since while the device being used by the caller to place the call has been recognized and/or authenticated by customer authentication computing platform 110 based on binding information maintained by customer authentication computing platform 110 (e.g., as illustrated above), additional credentials are required to establish the higher level of access and authentication needed to complete the requested transaction.

In some embodiments, one or more steps of the example event sequence discussed above may be repeated with respect to one or more other devices linked to one or more different user accounts and/or customers. Additionally or alternatively, over time, as a particular customer continues to use a particular device, customer authentication computing platform 110 may update authentication history information maintained for the particular device in associated with the binding information, and this may result in the particular device being accorded relatively higher trust levels. This, in turn, may allow customer authentication computing platform 110 to authenticate the particular device and set authentication flags that require relatively fewer authentication credentials, if any, to be provided when a customer using the device calls in for assistance.

Figure 5:
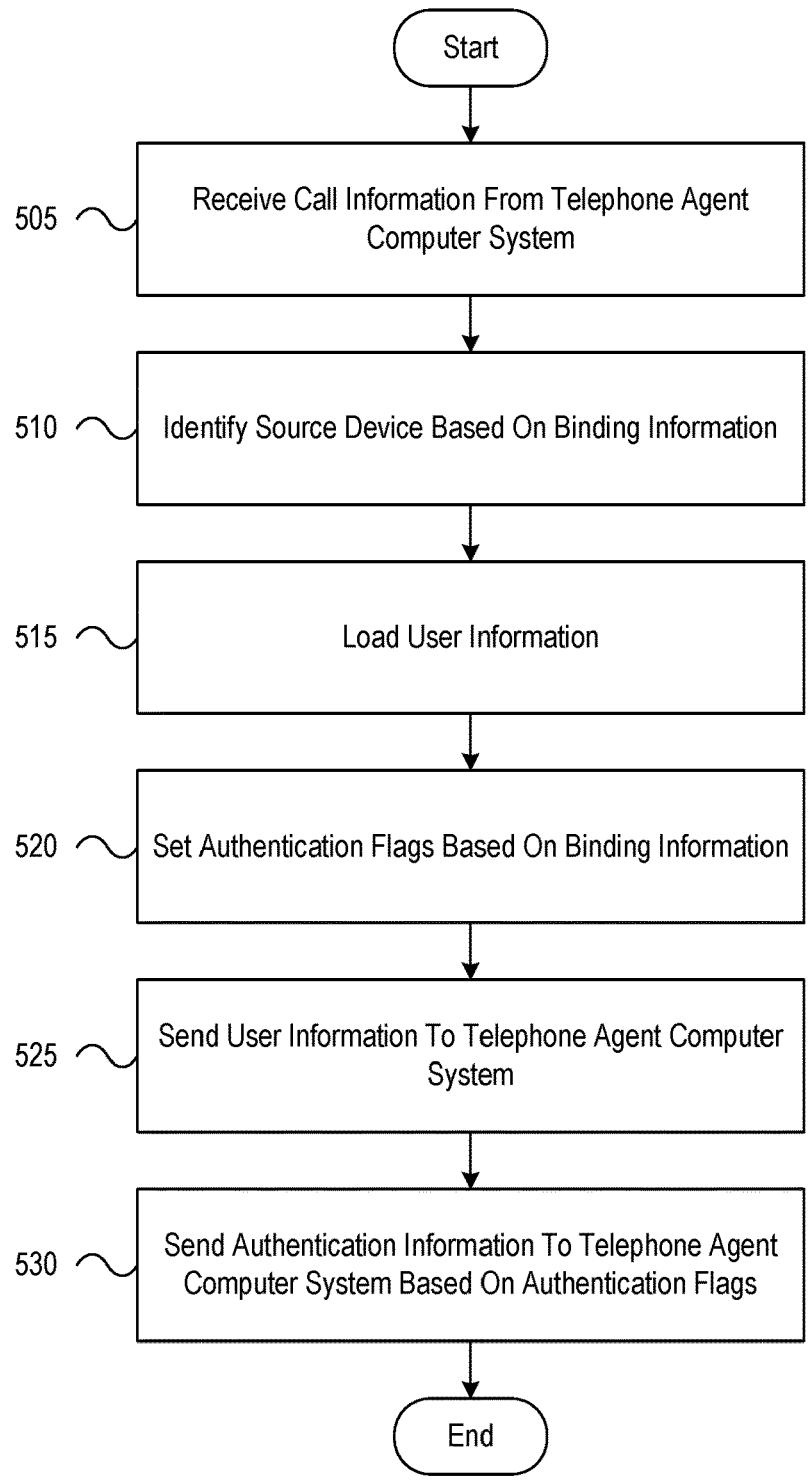
FIG. 5 depicts an illustrative method for recognizing and authenticating mobile devices based on unique cross-channel bindings in accordance with one or more example embodiments.

FIG. 5 depicts an illustrative method for recognizing and authenticating mobile devices based on unique cross-channel bindings in accordance with one or more example embodiments. Referring to FIG. 5, at step 505, a computing platform having at least one processor, a communication interface, and a memory may receive, via the communication interface, and from a telephone agent support computer system associated with a telephone agent channel, call information associated with a telephone call received by the telephone agent support computer system associated with the telephone agent channel. At step 510, the computing platform may identify a source device that placed the telephone call received by the telephone agent support computer system associated with the telephone agent channel, based on binding information maintained by the computing platform for the source device. At step 515, based on identifying the source device that placed the telephone call received by the telephone agent support computer system associated with the telephone agent channel, the computing platform may load user information associated with a user account linked to the source device. At step 520, the computing platform may set one or more authentication flags for the user account linked to the source device based on the binding information maintained by the computing platform for the source device. At step 525, the computing platform may send, via the communication interface, and to the telephone agent support computer system associated with the telephone agent channel, the user information associated with the user account linked to the source device. At step 530, the computing platform may send, via the communication interface, and to the telephone agent support computer system associated with the telephone agent channel, authentication information based on the one or more authentication flags set for the user account linked to the source device.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
    at least one processor;
    a communication interface communicatively coupled to the at least one processor; and
    memory storing computer-readable instructions that, when executed by the at least one processor, cause the computing platform to:
        receive, via the communication interface, and from a telephone agent support computer system associated with a telephone agent channel, call information associated with a telephone call received by the telephone agent support computer system associated with the telephone agent channel;
        identify a source device that placed the telephone call received by the telephone agent support computer system associated with the telephone agent channel, based on binding information maintained by the computing platform for the source device;
        based on identifying the source device that placed the telephone call received by the telephone agent support computer system associated with the telephone agent channel, load user information associated with a user account linked to the source device, wherein the user information associated with the user account linked to the source device comprises information identifying an online banking user account associated with an online banking channel of a financial institution, and wherein the telephone agent channel corresponds to a telephone support channel of the financial institution;
        set one or more authentication flags for the user account linked to the source device based on the binding information maintained by the computing platform for the source device, wherein setting the one or more authentication flags for the user account linked to the source device based on the binding information maintained by the computing platform for the source device comprises setting the one or more authentication flags for the user account linked to the source device based on authentication history information maintained for the source device, wherein the authentication history information maintained for the source device identifies a number of successful authentications of the source device on one or more channels of the financial institution, and wherein the one or more authentication flags for the user account linked to the source device are set to provide a level of access corresponding to the number of successful authentications of the source device on the one or more channels of the financial institution;

send, via the communication interface, and to the telephone agent support computer system associated with the telephone agent channel, the user information associated with the user account linked to the source device;

send, via the communication interface, and to the telephone agent support computer system associated with the telephone agent channel, authentication information based on the one or more authentication flags set for the user account linked to the source device, wherein sending the authentication information to the telephone agent support computer system associated with the telephone agent channel causes the telephone agent support computer system associated with the telephone agent channel to present a graphical user interface notifying a user of the telephone agent support computer system associated with the telephone agent channel of the level of access corresponding to the one or more authentication flags set for the user account linked to the source device; and after sending the authentication information to the telephone agent support computer system associated with the telephone agent channel, update the authentication history information maintained for the source device.

2. The computing platform of claim 1, wherein the memory stores additional computer-readable instructions that, when executed by the at least one processor, cause the computing platform to:

prior to receiving the call information associated with the telephone call from the telephone agent support computer system:

receive, via the communication interface, and from the source device, an authentication request;

based on receiving the authentication request from the source device, generate one or more authentication prompts for the source device;

provide the one or more authentication prompts to the source device;

validate one or more responses to the one or more authentication prompts provided to the source device; and based on validating the one or more responses to the one or more authentication prompts provided to the source device, provide the source device with access to user account information.

3. The computing platform of claim 2, wherein the memory stores additional computer-readable instructions that, when executed by the at least one processor, cause the computing platform to:

prior to receiving the call information associated with the telephone call from the telephone agent support computer system, and after providing the source device with access to user account information:

generate a probe request for the source device;

send, via the communication interface, and to a device monitoring and management computer system, the probe request generated for the source device;

receive, via the communication interface, and from the device monitoring and management computer system, device information for the source device; and bind the device information for the source device to the user account to link the source device to the user account.

4. The computing platform of claim 3, wherein binding the device information for the source device to the user account to link the source device to the user account comprises:

creating the binding information maintained by the computing platform for the source device based on the device information for the source device received from the device monitoring and management computer system.

5. The computing platform of claim 1, wherein the binding information maintained by the computing platform for the source device comprises a unique device identifier for the source device.

6. The computing platform of claim 5, wherein the binding information maintained by the computing platform for the source device comprises account profile information linking the unique device identifier for the source device to the user account.

7. The computing platform of claim 5, wherein the unique device identifier for the source device is derived by a device monitoring and management computer system based on one or more attributes of the source device.

8. The computing platform of claim 5, wherein the binding information maintained by the computing platform for the source device comprises a telephone number assigned to the source device.

9. The computing platform of claim 1, wherein identifying the source device that placed the telephone call received by the telephone agent support computer system associated with the telephone agent channel comprises:

matching a telephone number associated with the telephone call received by the telephone agent support computer system to a telephone number associated with a unique device identifier of the source device included in the binding information maintained by the computing platform for the source device.

10. The computing platform of claim 1, wherein sending the user information associated with the user account linked to the source device to the telephone agent support computer system comprises:

sending, to the telephone agent support computer system, customer name information associated with the user account linked to the source device, customer account information associated with the user account linked to the source device, and transaction history information associated with the user account linked to the source device.

11. The computing platform of claim 1, wherein setting the one or more authentication flags for the user account linked to the source device based on the binding information maintained by the computing platform for the source device comprises:

setting a first authentication flag allowing a first level of access to the user account based on a device authentication score associated with the source device being below a first threshold;
setting a second authentication flag allowing a second level of access to the user account based on the device authentication score associated with the source device being at or above the first threshold and below a second threshold; and
setting a third authentication flag allowing a third level of access to the user account based on the device authentication score associated with the source device being at or above the second threshold.

12. A method comprising:
at a computing platform comprising at least one processor, memory, and a communication interface:
receiving, by the at least one processor, via the communication interface, and from a telephone agent support computer system associated with a telephone agent channel, call information associated with a telephone call received by the telephone agent support computer system associated with the telephone agent channel;
identifying, by the at least one processor, a source device that placed the telephone call received by the telephone agent support computer system associated with the telephone agent channel, based on binding information maintained by the computing platform for the source device;
based on identifying the source device that placed the telephone call received by the telephone agent support computer system associated with the telephone agent channel, loading, by the at least one processor, user information associated with a user account linked to the source device, wherein the user information associated with the user account linked to the source device comprises information identifying an online banking user account associated with an online banking channel of a financial institution, and wherein the telephone agent channel corresponds to a telephone support channel of the financial institution;
setting, by the at least one processor, one or more authentication flags for the user account linked to the source device based on the binding information maintained by the computing platform for the source device, wherein setting the one or more authentication flags for the user account linked to the source device based on the binding information maintained by the computing platform for the source device comprises setting the one or more authentication flags for the user account linked to the source device based on authentication history information maintained for the source device, wherein the authentication history information maintained for the source device identifies a number of successful authentications of the source device on one or more channels of the financial institution, and wherein the one or more authentication flags for the user account linked to the source device are set to provide a level of access corresponding to the number of successful authentications of the source device on the one or more channels of the financial institution;
sending, by the at least one processor, via the communication interface, and to the telephone agent support computer system associated with the telephone agent channel, the user information associated with the user account linked to the source device;
sending, by the at least one processor, via the communication interface, and to the telephone agent support computer system associated with the telephone agent channel, authentication information based on the one or more authentication flags set for the user account linked to the source device, wherein sending the authentication information to the telephone agent support computer system associated with the telephone agent channel causes the telephone agent support computer system associated with the telephone agent channel to present a graphical user interface notifying a user of the telephone agent support computer system associated with the telephone agent channel of the level of access corresponding to the one or more authentication flags set for the user account linked to the source device; and
after sending the authentication information to the telephone agent support computer system associated with the telephone agent channel, updating, by the at least one processor, the authentication history information maintained for the source device.

13. The method of claim 12, further comprising:
prior to receiving the call information associated with the telephone call from the telephone agent support computer system:
receiving, by the at least one processor, via the communication interface, and from the source device, an authentication request;
based on receiving the authentication request from the source device, generating, by the at least one processor, one or more authentication prompts for the source device;
providing, by the at least one processor, the one or more authentication prompts to the source device;
validating, by the at least one processor, one or more responses to the one or more authentication prompts provided to the source device; and
based on validating the one or more responses to the one or more authentication prompts provided to the source device, providing, by the at least one processor, the source device with access to user account information.

14. The method of claim 13, further comprising:
prior to receiving the call information associated with the telephone call from the telephone agent support computer system, and after providing the source device with access to user account information:
generating, by the at least one processor, a probe request for the source device;
sending, by the at least one processor, via the communication interface, and to a device monitoring and management computer system, the probe request generated for the source device;
receiving, by the at least one processor, via the communication interface, and from the device monitoring and management computer system, device information for the source device; and
binding, by the at least one processor, the device information for the source device to the user account to link the source device to the user account.

15. The method of claim 14, wherein binding the device information for the source device to the user account to link the source device to the user account comprises:
creating the binding information maintained by the computing platform for the source device based on the device information for the source device received from the device monitoring and management computer system.

16. The method of claim 12, wherein the binding information maintained by the computing platform for the source device comprises a unique device identifier for the source device.

17. The method of claim 16, wherein the binding information maintained by the computing platform for the source device comprises account profile information linking the unique device identifier for the source device to the user account.

18. The method of claim 16, wherein the unique device identifier for the source device is derived by a device monitoring and management computer system based on one or more attributes of the source device.

19. The method of claim 16, wherein the binding information maintained by the computing platform for the source device comprises a telephone number assigned to the source device.

20. One or more non-transitory computer-readable media storing instructions that, when executed by a computing platform comprising at least one processor, memory, and a communication interface, cause the computing platform to:

receive, via the communication interface, and from a telephone agent support computer system associated with a telephone agent channel, call information associated with a telephone call received by the telephone agent support computer system associated with the telephone agent channel;

identify a source device that placed the telephone call received by the telephone agent support computer system associated with the telephone agent channel, based on binding information maintained by the computing platform for the source device;

based on identifying the source device that placed the telephone call received by the telephone agent support computer system associated with the telephone agent channel, load user information associated with a user account linked to the source device, wherein the user information associated with the user account linked to the source device comprises information identifying an online banking user account associated with an online banking channel of a financial institution, and wherein the telephone agent channel corresponds to a telephone support channel of the financial institution;

set one or more authentication flags for the user account linked to the source device based on the binding information maintained by the computing platform for the source device, wherein setting the one or more authentication flags for the user account linked to the source device based on the binding information maintained by the computing platform for the source device comprises setting the one or more authentication flags for the user account linked to the source device based on authentication history information maintained for the source device, wherein the authentication history information maintained for the source device identifies a number of successful authentications of the source device on one or more channels of the financial institution, and wherein the one or more authentication flags for the user account linked to the source device are set to provide a level of access corresponding to the number of successful authentications of the source device on the one or more channels of the financial institution;

send, via the communication interface, and to the telephone agent support computer system associated with the telephone agent channel, the user information associated with the user account linked to the source device;

send, via the communication interface, and to the telephone agent support computer system associated with the telephone agent channel, authentication information based on the one or more authentication flags set for the user account linked to the source device, wherein sending the authentication information to the telephone agent support computer system associated with the telephone agent channel causes the telephone agent support computer system associated with the telephone agent channel to present a graphical user interface notifying a user of the telephone agent support computer system associated with the telephone agent channel of the level of access corresponding to the one or more authentication flags set for the user account linked to the source device; and after sending the authentication information to the telephone agent support computer system associated with the telephone agent channel, update the authentication history information maintained for the source device.

* * * * *